US011292596B2

(12) United States Patent
Grubb et al.

(10) Patent No.: US 11,292,596 B2
(45) Date of Patent: Apr. 5, 2022

(54) UNMANNED AERIAL VEHICLE

(71) Applicant: The Boeing Company, Chicago, IL (US)

(72) Inventors: Matthew David Grubb, White Salmon, WA (US); Jeffrey David Lydecker, Hood River, OR (US); Wayne David Goodrich, Moses Lake, WA (US)

(73) Assignee: The Boeing Company, Chicago, IL (US)

( * ) Notice: Subject to any disclaimer, the term of this patent is extended or adjusted under 35 U.S.C. 154(b) by 545 days.

(21) Appl. No.: 16/184,100

(22) Filed: Nov. 8, 2018

(65)  Prior Publication Data

US 2019/0168872 A1   Jun. 6, 2019

Related U.S. Application Data

(60) Provisional application No. 62/595,069, filed on Dec. 5, 2017.

(51) Int. Cl.
*B64C 39/02* (2006.01)
*B64C 39/04* (2006.01)
(Continued)

(52) U.S. Cl.
CPC ............. *B64C 39/024* (2013.01); *B64C 1/26* (2013.01); *B64C 9/18* (2013.01); *B64C 39/04* (2013.01); *B64C 9/02* (2013.01); *B64C 2201/021* (2013.01); *B64C 2201/104* (2013.01); *B64C 2201/182* (2013.01); *B64C 2211/00* (2013.01); *H01Q 1/286* (2013.01); *H01Q 1/287* (2013.01)

(58) Field of Classification Search
CPC ....... B64C 39/04; B64C 1/26; B64C 2211/00; B64C 2201/20; B64C 2201/201; B64C 2201/104

See application file for complete search history.

(56)  References Cited

U.S. PATENT DOCUMENTS 1,927,352 A * 9/1933 Tetlow ................... B64C 39/04
                                                                244/13
3,640,491 A * 2/1972 Harrison ................. B64C 1/00
                                                                244/117 R (Continued)

FOREIGN PATENT DOCUMENTS

EP   3081482   10/2016
FR   1059020   3/1954

(Continued)

OTHER PUBLICATIONS

EPO, European Search Report for Appl. No. 18209527, dated Apr. 12, 2019.

(Continued)

*Primary Examiner* — Richard R. Green
*Assistant Examiner* — Arfan Y. Sinaki

(57)  ABSTRACT

An aircraft has a fuselage, a wing assembly coupleable to the fuselage, and an empennage including a pair of tail booms configured to be removably coupled to the wing assembly. The wing assembly includes a pair of boom interfaces located on laterally opposite sides of the fuselage. Each tail boom has a boom forward end configured to be mechanically attached to one of the boom interfaces using an externally-accessible mechanical fastener.

20 Claims, 31 Drawing Sheets

(51) Int. Cl.
  *B64C 9/18* (2006.01)
  *B64C 1/26* (2006.01)
  *B64C 9/02* (2006.01)
  *H01Q 1/28* (2006.01)

(56) References Cited

U.S. PATENT DOCUMENTS

| | | | | |
|---|---|---|---|---|
| 5,035,382 | A | * | 7/1991 | Lissaman ............... A63H 27/00 244/190 |
| 5,294,080 | A | | 3/1994 | Ross |
| 5,941,478 | A | * | 8/1999 | Schmittle ............ B64C 29/0033 244/48 |
| 7,098,856 | B2 | | 8/2006 | Taiyo |
| 7,185,847 | B1 | * | 3/2007 | Bouchard ............... F42B 10/12 244/3.28 |
| 7,699,261 | B2 | | 4/2010 | Colten et al. |
| 9,120,560 | B1 | | 9/2015 | Armer |
| 9,150,301 | B2 | * | 10/2015 | Liu ....................... B64C 39/024 |
| 9,266,610 | B2 | | 2/2016 | Knapp et al. |
| 9,340,301 | B2 | | 5/2016 | Dickson et al. |
| 10,364,036 | B2 | | 7/2019 | Tighe |
| 2003/0057325 | A1 | | 3/2003 | Carroll |
| 2004/0217912 | A1 | | 11/2004 | Mohammadian |
| 2006/0158383 | A1 | | 7/2006 | Kwon |
| 2008/0062047 | A1 | | 3/2008 | Iwata |
| 2008/0149758 | A1 | * | 6/2008 | Colgren ................. B64C 39/024 244/13 |
| 2008/0217486 | A1 | | 9/2008 | Colten et al. |
| 2009/0108142 | A1 | | 4/2009 | Wright |
| 2016/0129998 | A1 | | 5/2016 | Welsh |
| 2016/0200436 | A1 | | 7/2016 | North |
| 2016/0244144 | A1 | | 8/2016 | Karem |
| 2016/0375987 | A1 | * | 12/2016 | Shmilovich ............ B64C 21/04 244/207 |
| 2017/0005403 | A1 | | 1/2017 | Lam |
| 2017/0253319 | A1 | * | 9/2017 | Vance .................... B64D 41/00 |
| 2017/0283033 | A1 | * | 10/2017 | Gamble .................. B64C 3/385 |
| 2017/0349281 | A1 | * | 12/2017 | Quinlan ................... B64D 5/00 |
| 2018/0057136 | A1 | * | 3/2018 | Haley .................. A63H 27/001 |
| 2018/0086458 | A1 | * | 3/2018 | Sartorius ................ B64C 3/187 |
| 2019/0002076 | A1 | * | 1/2019 | Markley ................... B64C 3/50 |
| 2019/0135403 | A1 | * | 5/2019 | Perry .................... B64C 39/024 |

FOREIGN PATENT DOCUMENTS

| | | | | |
|---|---|---|---|---|
| FR | 1059020 A | * | 3/1954 | ............ B64C 39/04 |
| WO | WO2013070296 | | 5/2013 | |
| WO | WO2015157114 | | 10/2015 | |

OTHER PUBLICATIONS

Search Report for Dutch Patent Application No. NL 2020397, dated Aug. 15, 2018.

Insitu Corporation, "Integrator" brochure, available at <https://insitu.com/information-delivery/unmanned-systems/integrator#2>, retrieved on Mar. 27, 2018.

EPO, European Search Report, Appl. No. EP20189851, dated Nov. 12, 2020.

\* cited by examiner

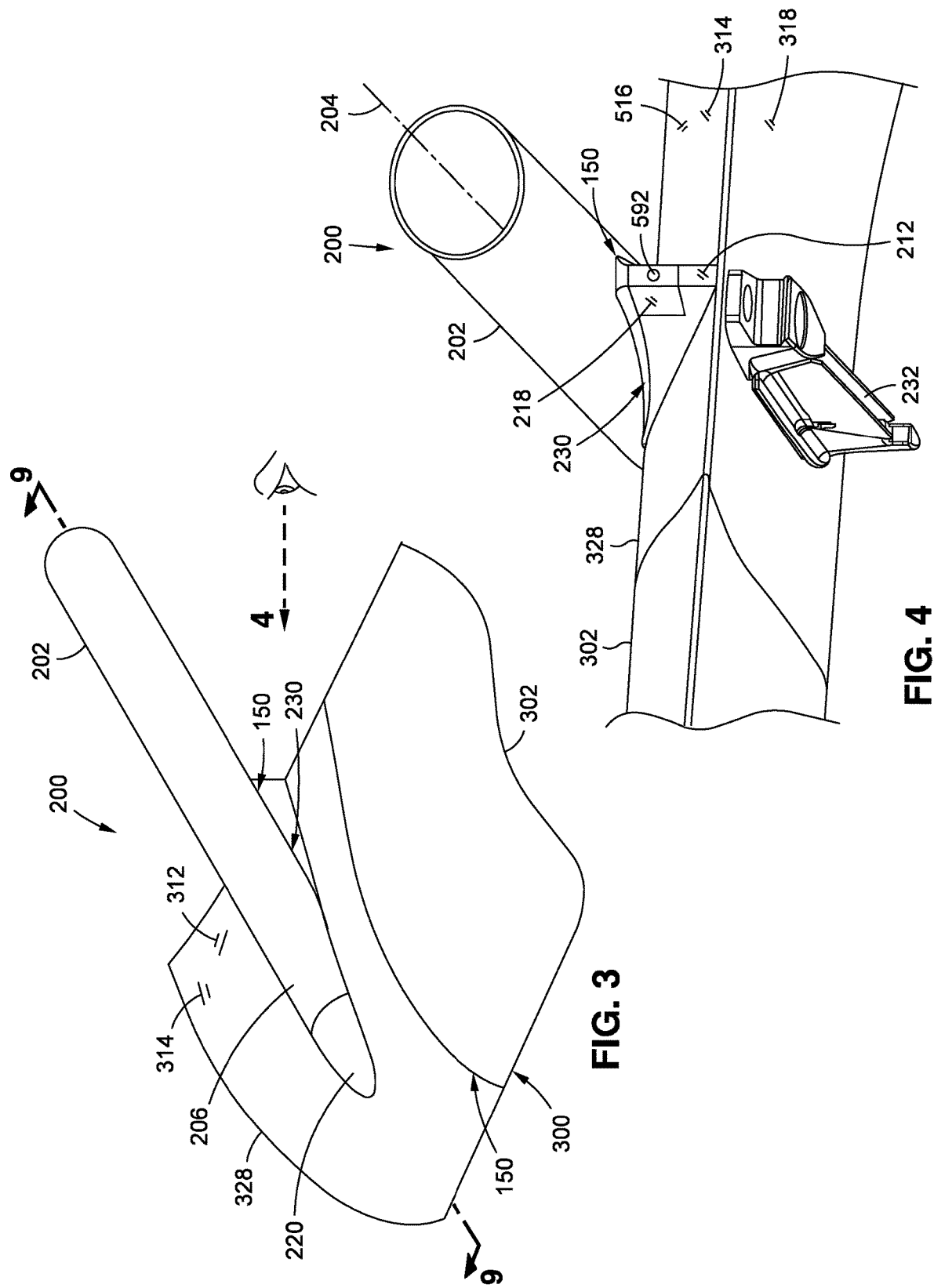

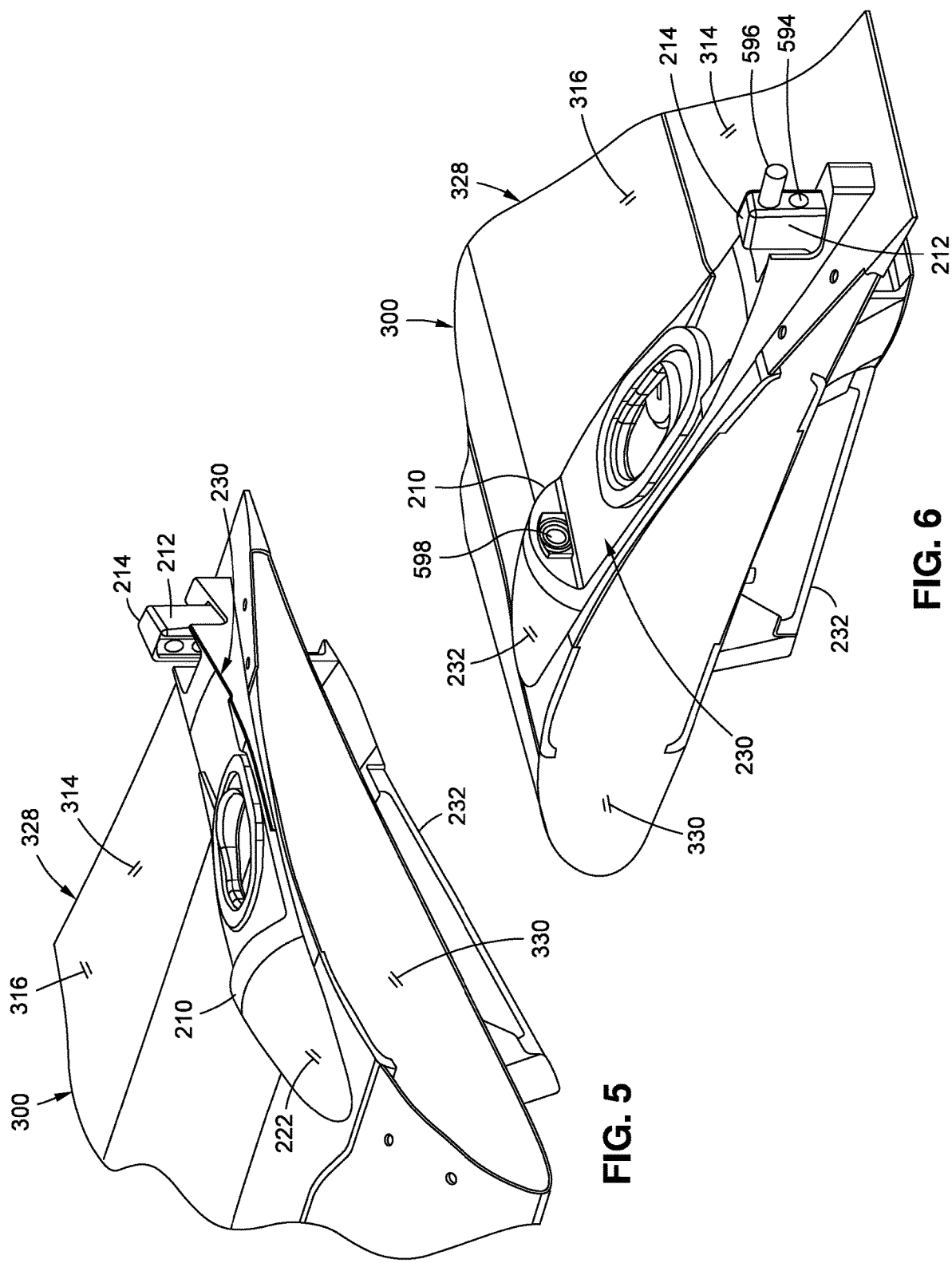

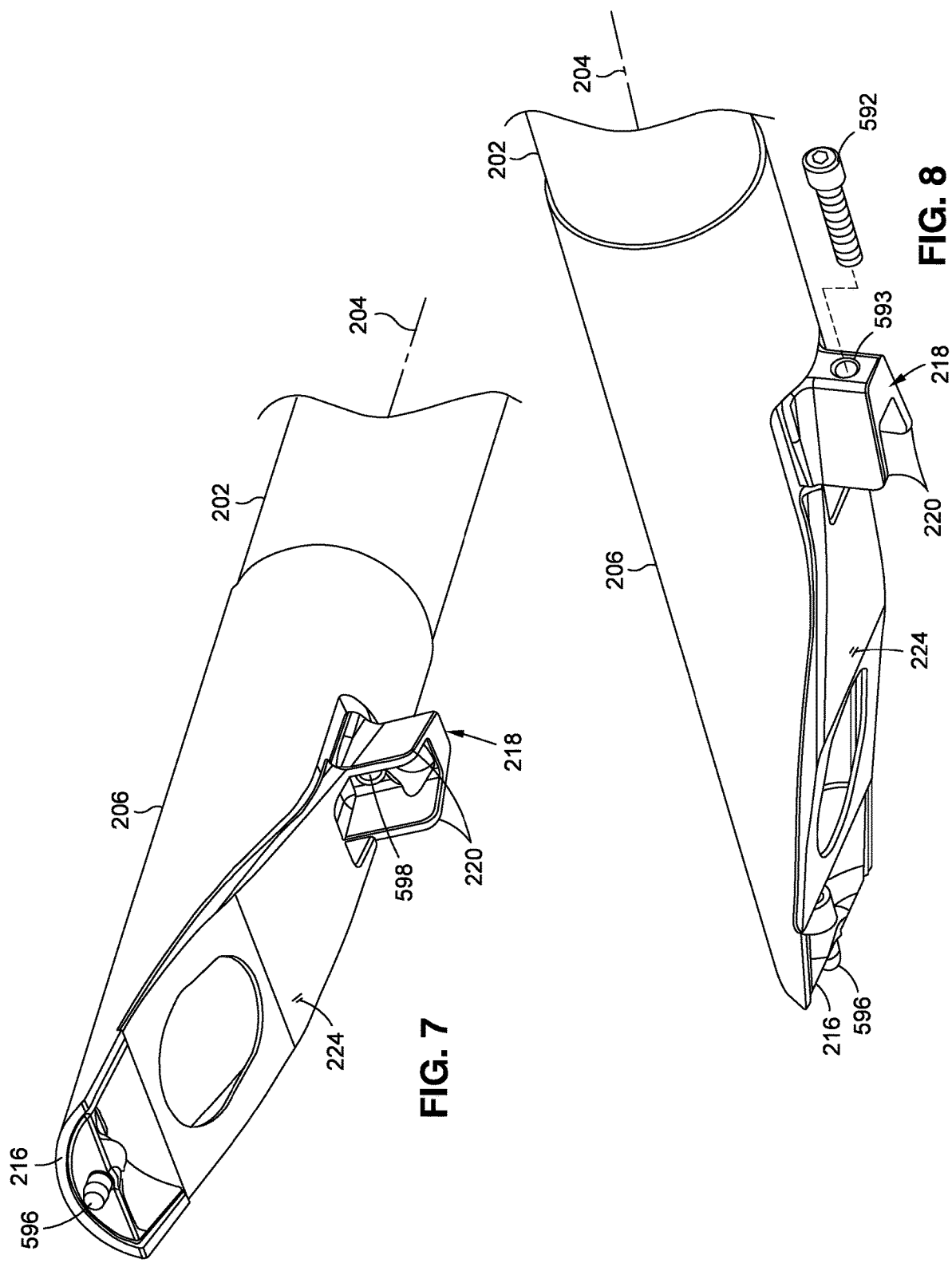

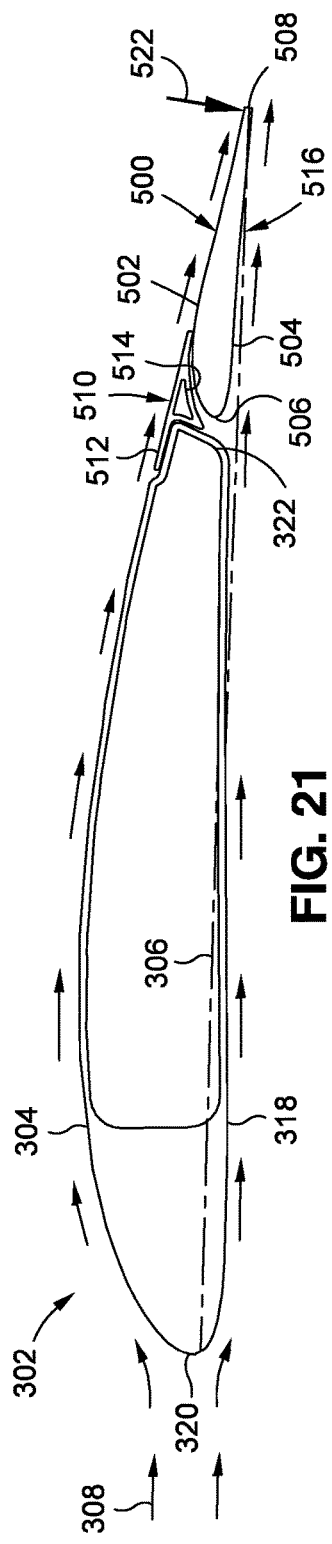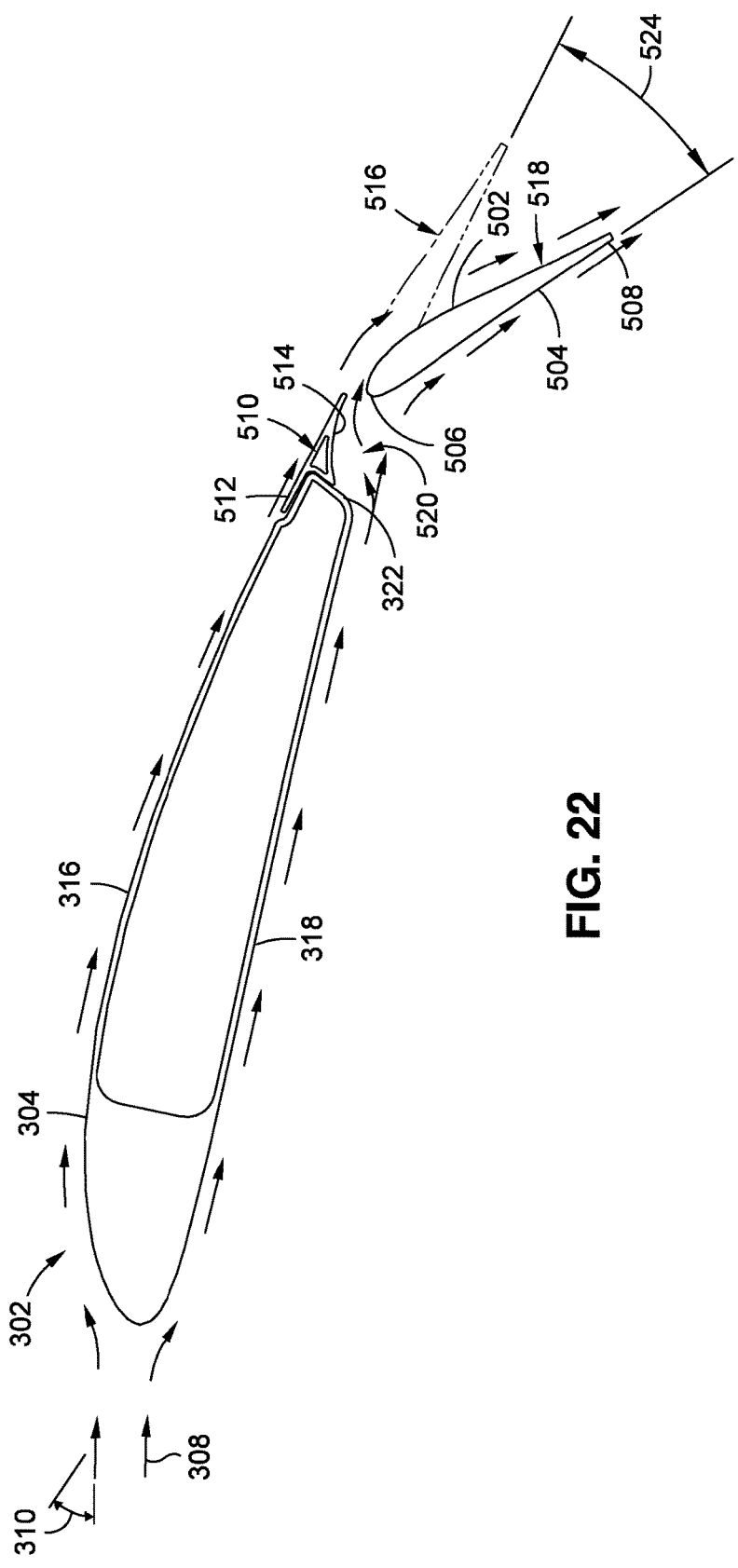

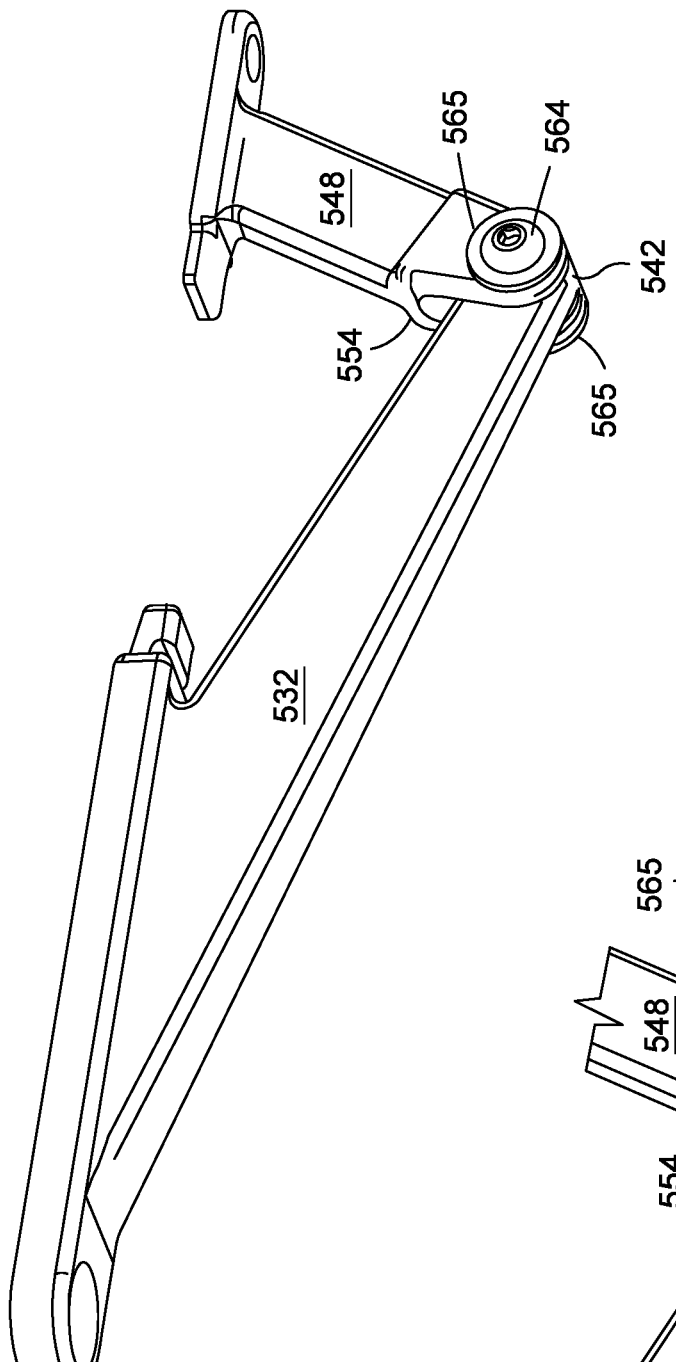
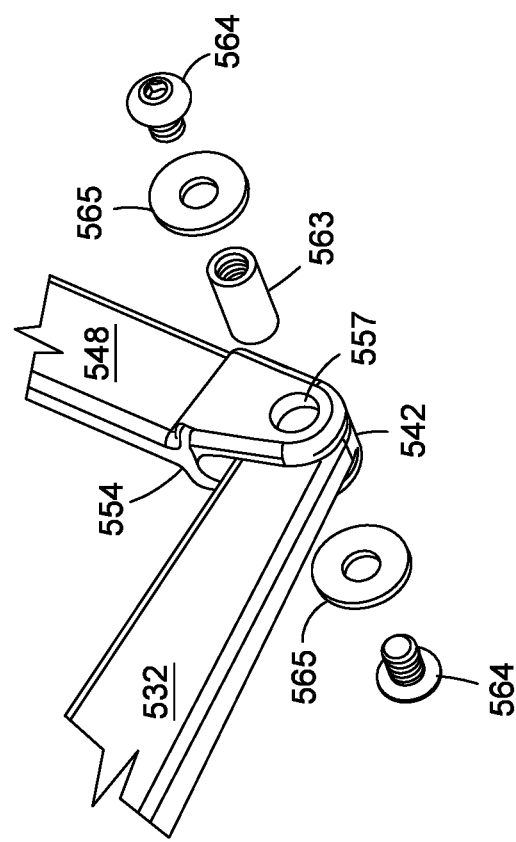

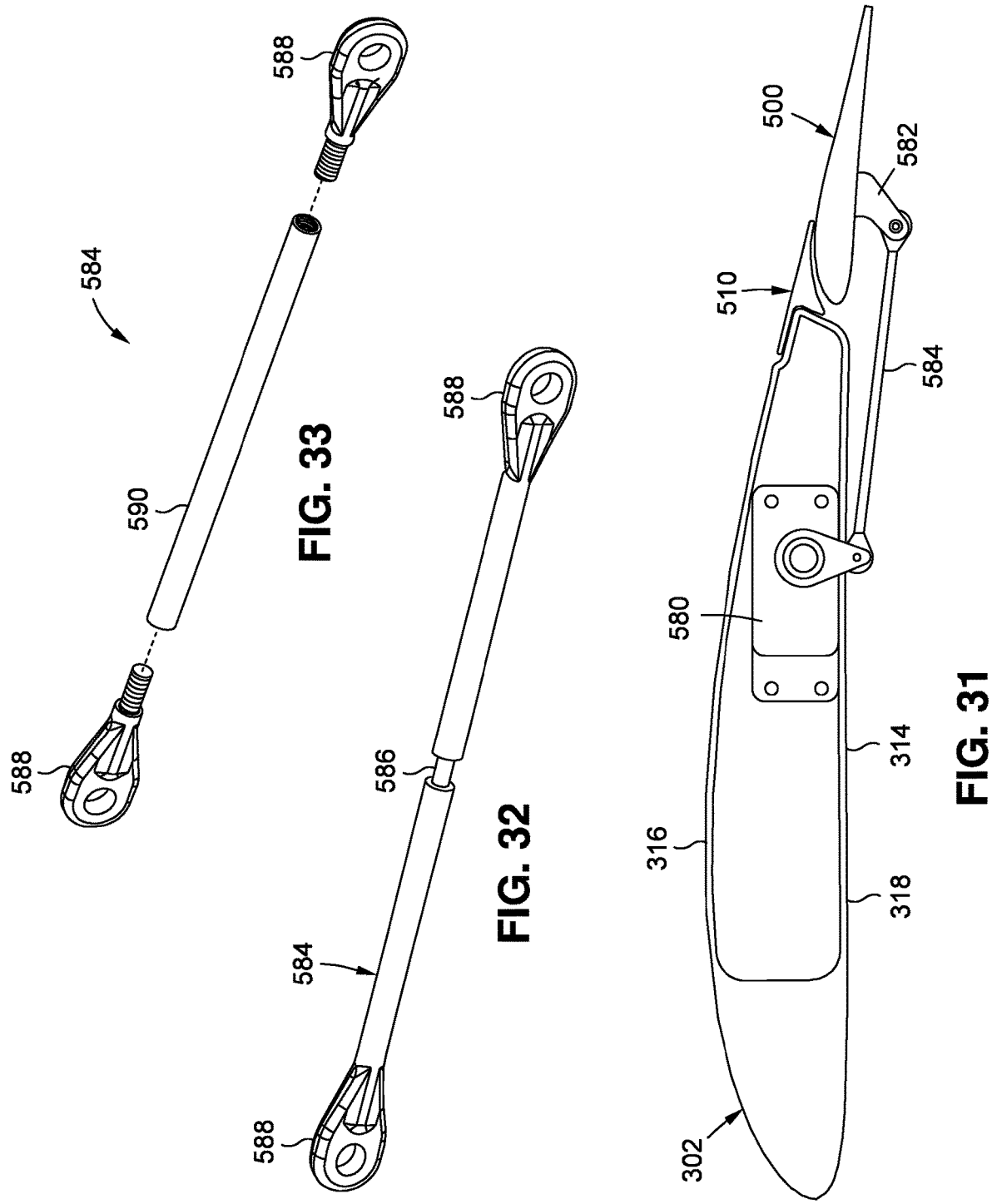

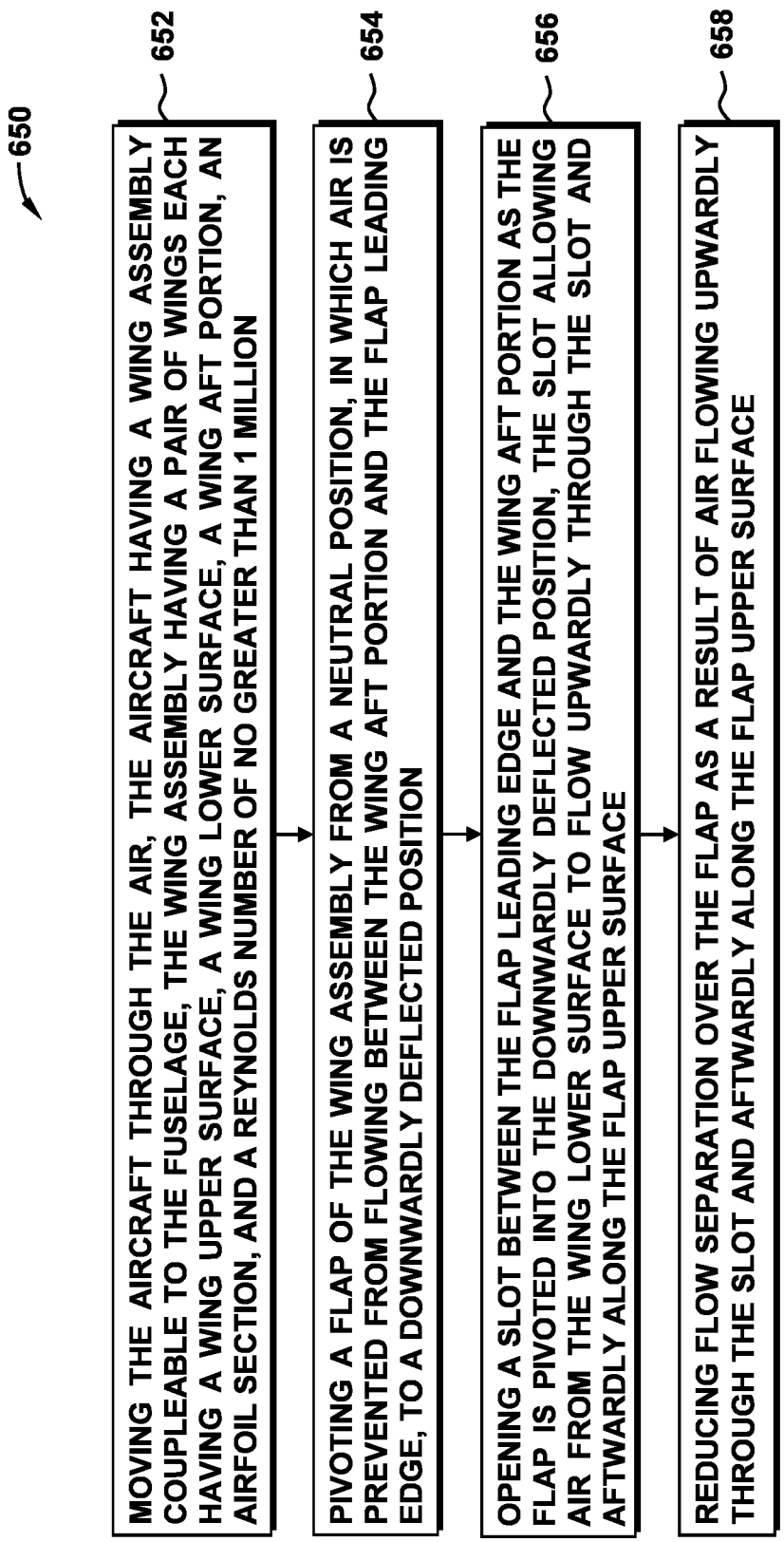

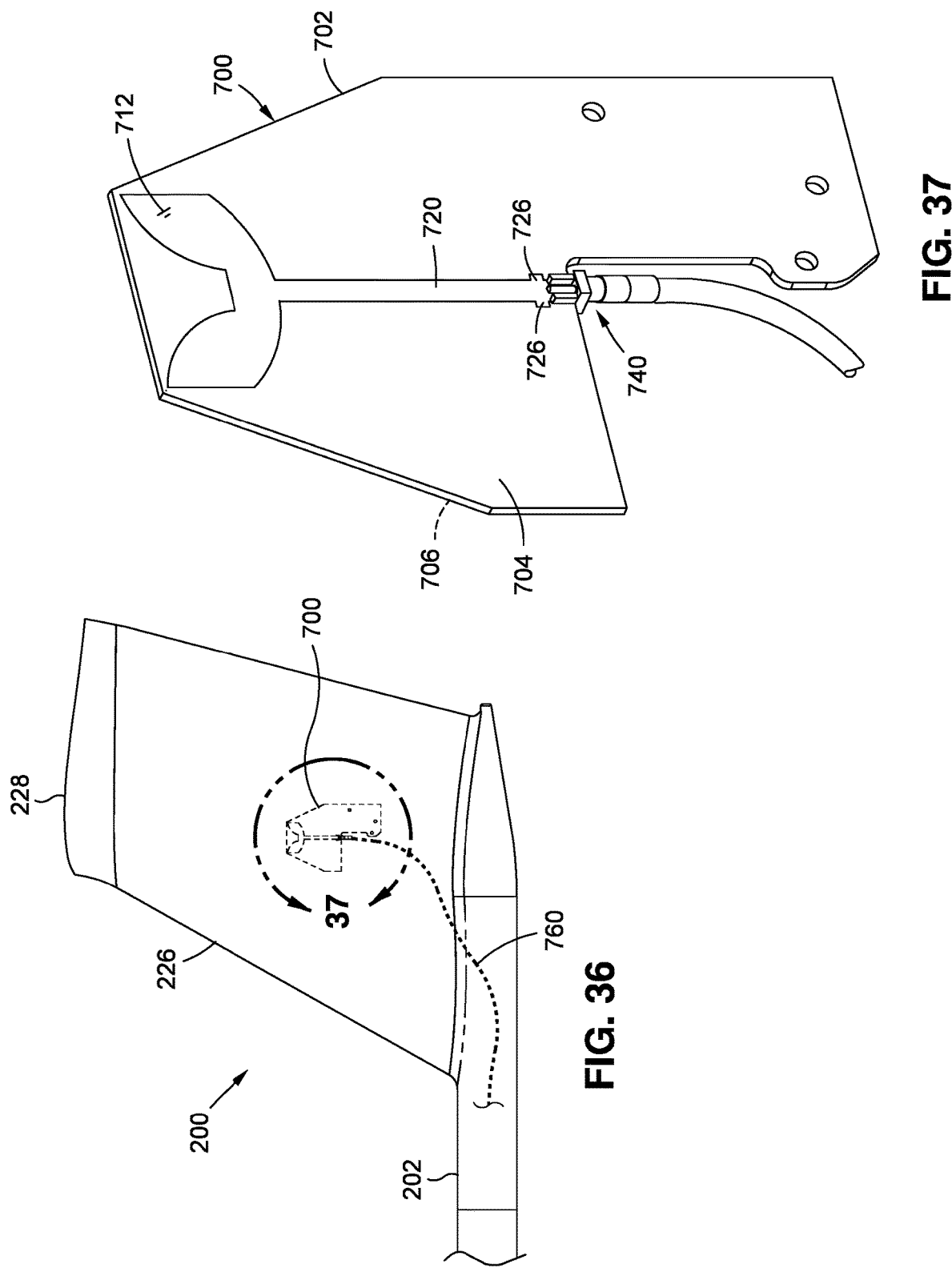

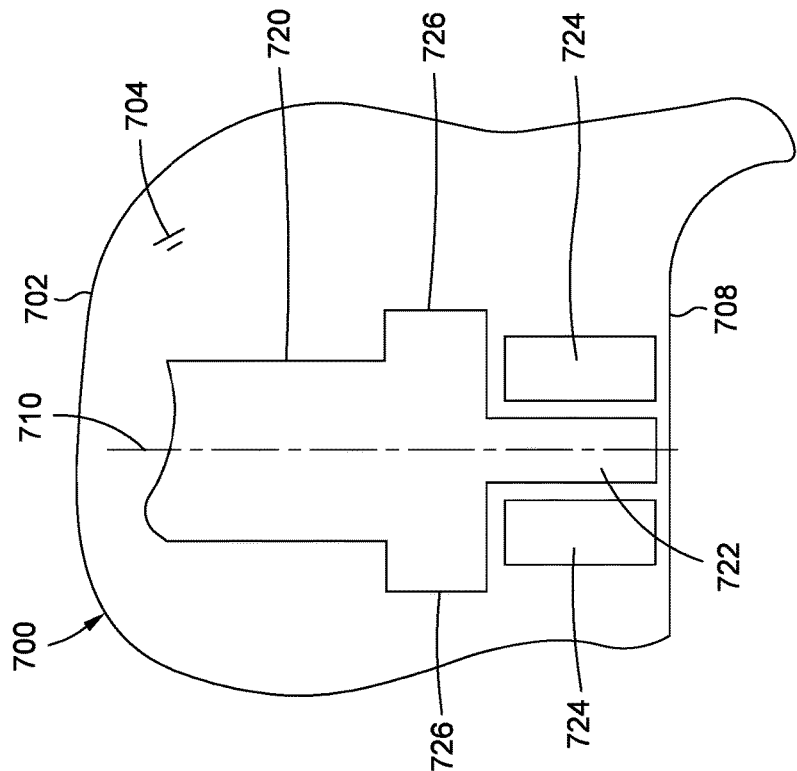
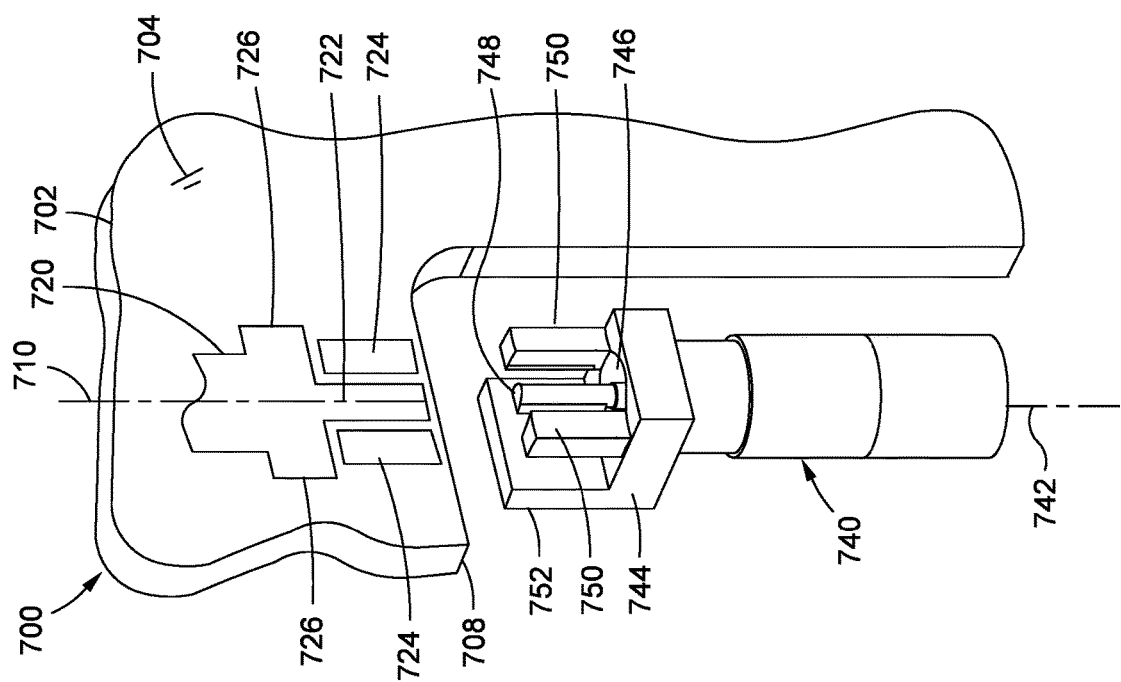
FIG. 44
FIG. 43

UNMANNED AERIAL VEHICLE

CROSS-REFERENCE TO RELATED APPLICATIONS

The application claims priority to U.S. Provisional Application Ser. No. 62/595,069, filed Dec. 5, 2017, which is incorporated herein by reference in its entirety.

FIELD

The present disclosure relates generally to aircraft configurations and, more particularly, to an unmanned aerial vehicle configured to be field assembled and having improved performance characteristics.

BACKGROUND

Unmanned aerial vehicles (UAVs) are increasingly used for performing a variety of functions. For example, UAVs may be implemented for delivering payloads, collecting imaging data for surveillance and reconnaissance, performing emergency services such as firefighting management, locating schools of fish, and other functions. For certain applications, it is desirable that UAVs are easily transportable to remote locations and are able to be quickly assembled and disassembled in the field (e.g., land or sea) using a minimal number of tools and/or fasteners.

In addition, it is desirable to be able to launch and recover UAVs in environments (e.g., mountainous terrain, at sea) where a dedicated runway may not be available and independent of wind direction. For example, a UAV may be launched into the wind using an appropriately oriented portable catapult launch. The UAV may be recovered using a portable recovery system having a recovery cord that is vertically suspended from a mast. The UAV may include wing tip mechanisms configured to latch onto the recovery cord as the UAV flies into the recovery cord. Preferably, the UAV is able to fly into the recovery cord at a relatively slow airspeed to minimize the amount of energy that the recovery system must absorb when stopping the UAV.

Furthermore, it is desirable that a UAV can be remotely controlled regardless of the orientation or attitude of the UAV. In addition, it is desirable that UAVs are capable of receiving and transmitting a variety of different types of data over multiple frequency bands. For example, the flight of the UAV may be remotely controlled using radio signals transmitted to the UAV from a surface-based remote control device using a first frequency band, while imaging data generated by an onboard imaging system may be transmitted from the UAV to a surface station using a second frequency band that is different than the first frequency band.

SUMMARY

The above-noted needs associated with unmanned aerial vehicles are specifically addressed by the present disclosure which provides an aircraft having a fuselage, a wing assembly coupleable to the fuselage, and an empennage including a pair of tail booms configured to be removably coupled to the wing assembly. The wing assembly includes a pair of boom interfaces located on laterally opposite sides of the fuselage. Each tail boom has a boom forward end configured to be mechanically attached to one of the boom interfaces using an externally-accessible mechanical fastener.

Also disclosed is a method of enhancing vehicle efficiency. The method includes attaching a pair of tail booms of an empennage to a wing assembly mounted to a fuselage by positioning a boom forward end of each tail boom against a boom interface of the wing assembly, and installing at least one externally-accessible mechanical fastener through the boom forward end and into a threaded hole in the boom interface.

In a further embodiment, disclosed is an aircraft having a fuselage and a wing assembly coupleable to the fuselage. The wing assembly includes a pair of wings each having a wing upper surface, a wing lower surface, a wing aft portion, an airfoil section, and a Reynolds number of no greater than 1.5 million. Each wing includes a flap having a flap leading edge and a flap upper surface. The flap of each wing is coupled to the wing aft portion in a manner such that when the flap is in a neutral position, air is prevented from flowing between the wing aft portion and the flap leading edge. When the flap is pivoted into a downwardly deflected position, a slot opens up between the flap leading edge and the wing aft portion, allowing air from the wing lower surface to flow upwardly through the slot and aftwardly along the flap upper surface.

Disclosed is a method of operating the above-described aircraft as the aircraft is moving through air. As mentioned above, the aircraft has a wing assembly coupleable to the fuselage, and the wing assembly has a pair of wings each having a wing upper surface, a wing lower surface, a wing aft portion, an airfoil section, and a Reynolds number of no greater than 1.5 million. The method includes pivoting a flap of each wing from a neutral position in which air is prevented from flowing between the wing aft portion and a flap leading edge, to a downwardly deflected position. In addition, the method includes opening a slot between the flap leading edge and the wing aft portion as each flap is pivoted into the downwardly deflected position, the slot allowing air from the wing lower surface to flow upwardly through the slot and aftwardly along a flap upper surface. The method also includes reducing flow separation over the flap as a result of the air flowing upwardly through the slot and aftwardly along the flap upper surface.

Also disclosed is an antenna. The antenna includes a dielectric substrate having a first surface, an opposing second surface, and a substrate lower edge. In addition, the antenna includes a radiating element formed on the first surface and configured to radiate and receive radio signals. The radiating element has a microstrip feed element extending to the substrate lower edge. Additionally, the antenna includes a ground plane formed on the second surface and configured to reflect the radio signals. The antenna also includes an edge-mounted connector mounted at the substrate lower edge and configured to electrically connect the antenna to a coaxial cable configured to transmit line signals to and from the antenna. The edge-mounted connector includes a center pin electrically coupled to the microstrip feed element, and a plurality of mounting prongs electrically coupled to the ground plane. The microstrip feed element includes a pair of stubs laterally protruding respectively from opposite sides of the microstrip feed element. The ground plane includes a pair of ground plane slots respectively on opposite sides of an antenna axis. The ground plane slots each extend upwardly from a ground plane lower edge to a location below a ground plane upper edge. The ground plane slots attenuate leakage currents flowing over the coaxial cable.

Disclosed is a method of radiating and receiving radio signals using the antenna. The method includes transmitting line signals over a coaxial cable coupled to the antenna. As mentioned above, the antenna has a dielectric substrate, a radiating element and a microstrip feed element formed on a first surface of the substrate, and a ground plane formed on a second surface of the substrate. The ground plane includes a pair of ground plane slots respectively on opposite sides of an antenna axis. The ground plane slots each extend upwardly from a ground plane lower edge to a location below a ground plane upper edge. The method additionally includes radiating and receiving, using the radiating element, radio signals associated with the line signals transmitted over the coaxial cable, reflecting the radio signals using the ground plane, and suppressing, using the ground plane slots, parasitic currents flowing on the coaxial cable when radiating and receiving radio signals using the radiating element, thereby improving impedance matching for the antenna.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is an aft-looking view of a field joint between a tail boom and a wing assembly of the UAV;

FIG. 4 is a forward-looking view of the field joint of the tail boom taken along line 4 of FIG. 3;

FIG. 5 is an aft-looking view of a boom interface incorporated into the wing assembly at the field joint;

FIG. 6 is a forward-looking view of the boom interface of FIG. 5;

FIG. 7 is an aft-looking view of the boom forward end configured to be engaged to the boom interface;

FIG. 8 is a forward-looking view of the boom forward end;

FIG. 21 is a cross-sectional view of the wing taken along line 21 of FIG. 20 and illustrating a flap mounted aft of the wing and oriented in a neutral position;

FIG. 22 is a cross-sectional view of the wing at an angle of attack and further illustrating the flap in a downwardly deflected position resulting in a slot between the flap leading edge and the wing aft portion allowing air from the wing lower surface to flow upwardly through the slot and afterwardly along the flap upper surface;

FIG. 25 is a perspective view of an example of a pivotal connection of the hinge bracket to the flap bracket;

FIG. 26 is an exploded view of the pivotal connection of the hinge bracket to the flap bracket of FIG. 25;

FIG. 31 is a sectional view of the wing assembly illustrating a flap actuator operably coupled to the flap;

FIG. 32 is an example of an actuator rod coupling the flap to a flap actuator and having an annular notch defining a location of bending failure of the actuator rod;

FIG. 33 is an example of an actuator rod configured as a hollow tube having a wall thickness configured to fail in bending;

FIG. 35 is a flowchart of operations included in a method of operating an aircraft, and including reducing flow separation over the flaps as a result of air flowing upwardly through a slot and aftwardly along the flap upper surface as illustrated in FIG. 22;

FIG. 36 is a side view of an example of a vertical tail extending upwardly from the boom aft end of a tail boom of the UAV and further illustrating an example of a wideband omnidirectional antenna mounted to the vertical tail;

FIG. 37 is a perspective view of the example antenna shown in FIG. 36;

FIG. 43 is an exploded perspective view of a lower portion of the first surface having a pair of prong pads and a pin pad for respectively coupling to a pair of mounting prongs and center pin extending upwardly from the edge-mounted connector;

FIG. 44 is a magnified view of the first surface of the antenna illustrating the prong pads and the pin pad and further illustrating a pair of stubs extending laterally outwardly from the microstrip feed element for enhanced wideband impedance matching;

DETAILED DESCRIPTION

Figure 1:
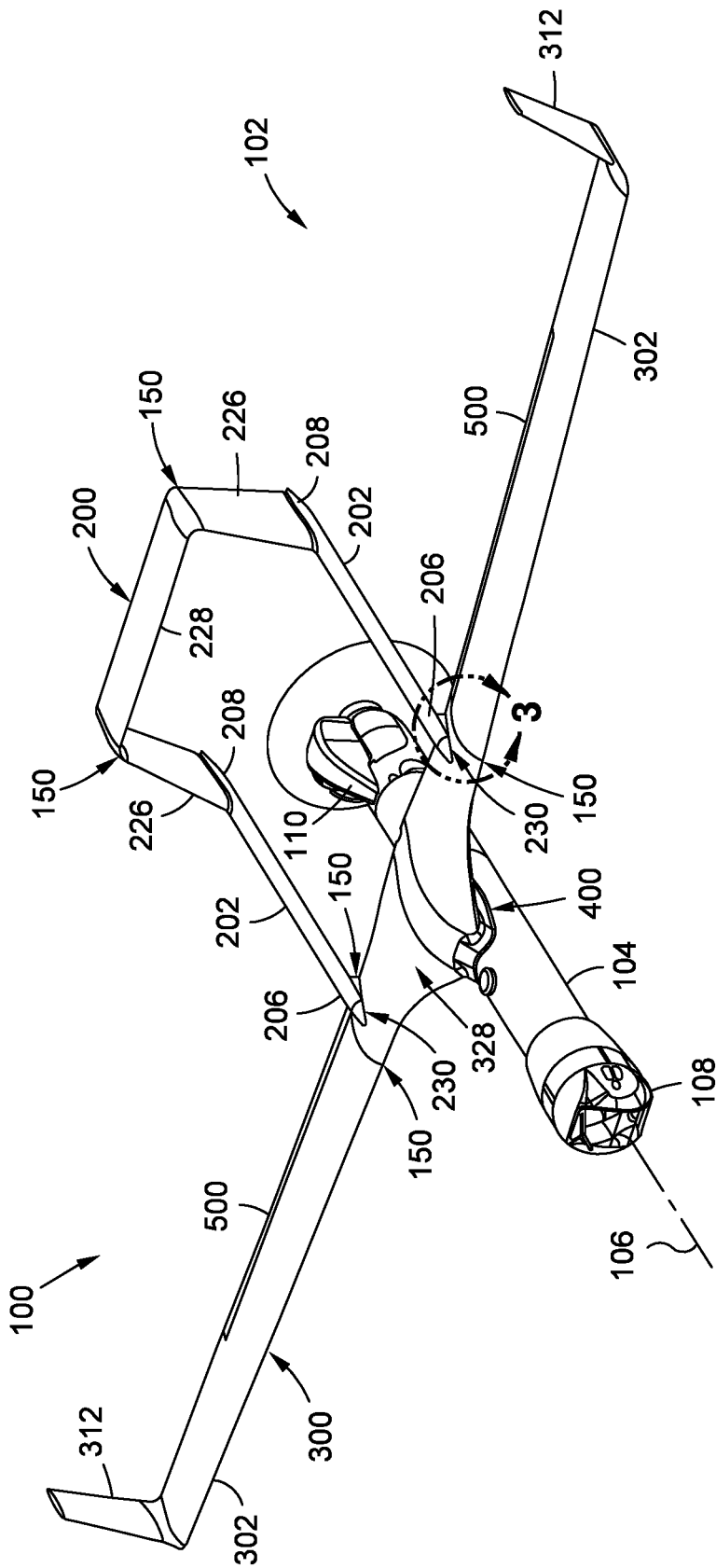
FIG. 1 is a perspective view of an example of an unmanned aerial vehicle (UAV) in an assembled state.

Referring now to the drawings wherein the showings are for purposes of illustrating preferred and various embodiments of the disclosure, shown in FIG. 1 is a perspective view of an example of an aircraft 100 configured as an unmanned aerial vehicle (UAV) 102 shown in an assembled state. The UAV 102 may have a relatively small size and a low gross weight, and is configured to be field assembled and disassembled into several lightweight components that can be packed into one or more relatively small transport cases (not shown) and shipped by land, sea, or air to any location. Once at the desired location, the components may be quickly assembled at several field joints 150 using fastening mechanisms such as shear pins and/or a minimal number of mechanical fasteners. For example, the wing assembly 300 of the UAV 102 may include a pair of field joints 150 respectively joining a pair of wings 302 to opposite sides of a wing center module 328. A wing-fuselage interface 400 of the UAV 102 may include a field joint 150 joining the wing center module 328 to the fuselage 104. The empennage 200 of the UAV 102 may be attached to the wing assembly 300 at a pair of field joints 150 respectively joining a pair of tail booms 202 to the wing center module 328. The empennage 200 may include a pair of field joints 150 respectively joining a horizontal tail 228 to a pair of vertical tails 226 extending upwardly from the aft end of the tail booms 202. After field assembly is complete, the UAV 102 may be launched using a portable launcher (not shown) without the need for a dedicated runway. At the completion of a mission, the UAV 102 may be recovered using a recovery system (e.g., FIG. 34) that also avoids the need for a runway, as described below.

Figure 2:
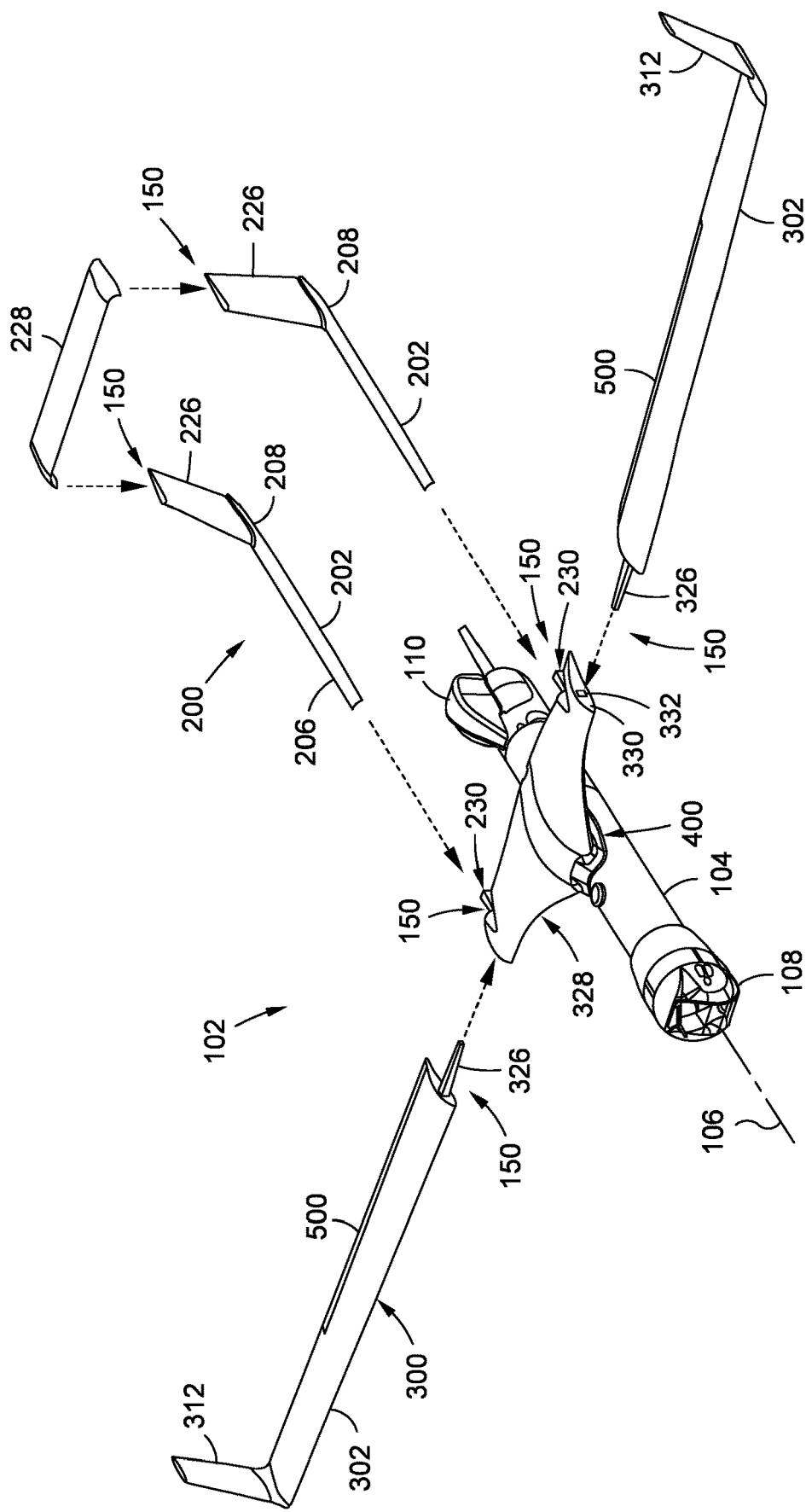
FIG. 2 is a perspective view of the UAV of FIG. 1 in a disassembled state.

Referring to FIGS. 1-2, the UAV 102 includes a fuselage 104 defining a longitudinal axis 106, a propulsion pod 110 mounted to an aft end of the fuselage 104, a wing assembly 300 removably coupled to the fuselage 104, and an empennage 200 removably coupled to the wing assembly 300. The propulsion pod 110 may be an internal combustion engine or a gas turbine driving a propeller, a turbojet engine (not shown), an electric engine such as an electrical propulsion system powered by hydrogen fuel cell, or a hybrid engine such as an electric-internal combustion engine. The fuselage 104 is shown having a rounded or cylindrical cross-sectional shape. However, the fuselage 104 may be provided in any one a variety of different cross-sectional shapes. The fuselage 104 may include one or more payload bays (not shown) for containing various payloads. For example, the payload bays may be located forward, underneath, and/or aft of the wing assembly 300. The payload bays (not shown) may include a mid bay located under the wing assembly 300, an avionics bay located forward of the wing assembly 300, and/or an aft avionics bay located aft of the wing assembly 300. An imaging system 108 may be coupled to a nose payload support and may include infrared sensors and/or electro-optical sensors for infrared imaging and/or visible light imaging.

As mentioned above, the wing assembly 300 includes the wing center module 328 and the pair of wings 302 (i.e., a left wing and a right wing). As described in greater detail below, the wing center module 328 may be coupled to the fuselage 104 at the wing-fuselage interface 400 (e.g., FIGS. 11-17) which may be configured as a field joint 150. In addition, the wing-fuselage interface 400 may be configured to allow for adjustment of the forward-aft location of the wing assembly 300 relative to the fuselage 104 to allow for a wide range of payload capabilities in the different payload bays, while maintaining the aircraft center of gravity (not shown) within a predetermined fore-aft range of the aircraft center of lift (not shown) without the need for ballast. Each one of the pair of wings 302 is configured to be removably coupled (i.e., field assembled) to the wing center module 328 at a field joint 150, as mentioned above. For example, each wing 302 may have a joiner spar 326 protruding from an inboard side of the wing 302. Each of the outboard sides of the wing center module 328 has a wing rib 330 containing a joiner spar pocket 332 configured to receive the joiner spar 326 for coupling a wing 302 to the wing center module 328. Once the joiner spar 326 of a wing 302 is inserted into a joiner spar pocket 332, one or more mechanical fasteners (not shown) may be manipulated to lock the wing 302 to the wing center module 328.

Referring still to FIGS. 1-2, the empennage 200 includes the pair of tail booms 202 (e.g., a left boom and a right boom) extending aftwardly from the wing center module 328 on opposite sides of the fuselage 104. The tail booms 202 may be formed of lightweight metallic and/or non-metallic material. For example, the tail booms 202 may be formed of composite material such as carbon-fiber reinforced polymer matrix material (e.g., graphite/epoxy). Each tail boom 202 is provided in a length sufficient to provide longitudinal (e.g., pitch) stability for the UAV 102 within a wide range of center of gravity locations. Each tail boom 202 may be oriented generally parallel to the aircraft longitudinal axis 106.

Each tail boom 202 has a boom forward end 206, a boom aft end 208, and a boom axis 204 (FIG. 7) extending between the boom forward end 206 and the boom aft end 208. The boom aft end 208 of each tail boom 202 has a vertical tail 226 extending upwardly from the tail boom 202. Although shown in FIGS. 1-2 as extending vertically upwardly at a slight angle (e.g., 10°) relative to vertical when the wing assembly 300 is horizontal, each vertical tail 226 may extend upwardly at an angle of between 0° and 45° relative to vertical. The empennage 200 includes a horizontal tail 228 extending between and removably coupled to the vertical tails 226 via a pair of field joints 150. For example, each vertical tail 226 may include a fitting (not shown) having one or more threaded holes or receptacles (e.g., nutplates) configured to receive one or more mechanical fasteners 592 (e.g., bolts, screws, etc.) for securing each side of the horizontal tail 228 to a vertical tail 226.

Referring to FIGS. 3-4, the wing center module 328 includes a pair of boom interfaces 230 representing the field joints 150 for attaching the tail booms 202 to the wing center module 328. In the example shown, the pair of boom interfaces 230 are respectively located adjacent to the laterally outboard sides of the wing center module 328. To simplify field assembly and disassembly of the UAV 102, the boom forward end 206 of each tail boom 202 is configured to be mechanically attached to a boom interface 230 using at least one externally-accessible mechanical fastener 592 (e.g., an Allen screw—FIG. 8). As described below, the externally-accessible mechanical fastener 592 is configured to engage a threaded hole 594 in the boom interface 230 for removably attaching the boom forward end 206 to the wing center module 328. At the location of each boom interface 230, a launch rib 232 protrudes downwardly from the wing lower surface 318 of the wing assembly 300. The launch ribs 232 support the UAV 102 on guide rails (not shown) of a launch system (not shown) during launching of the UAV 102. Each launch rib 232 and boom interface 230 may be mechanically fastened to a wing rib 330 (FIG. 5) located on each of laterally opposing sides of the wing center module 328 as described in greater detail below. The tail booms 202 are aligned with the wing ribs 330 and launch ribs 232 to provide a simple structural location for attachment of the tail booms 202 with minimal impact on the aerodynamics of the UAV 102.

Referring to FIGS. 5-6, shown is the boom interface 230 on one of the laterally opposing sides of the wing center module 328. The boom interface 230 is configured to receive a boom forward end 206 of a tail boom 202. The boom interface 230 includes a boom forward attachment fitting 210 and a boom aft attachment fitting 212 protruding from the wing upper surface 316 of the wing center module 328. A forward end of the boom interface 230 includes a boom fairing 222 for reducing aerodynamic drag of the boom interface 230. The boom interface 230 has at least one shear pin bore 598 for receiving at least one shear pin 596 (FIGS. 6 and 7) mounted to the tail boom 202. The boom interface 230 may additionally include at least one shear pin 596 for engagement into a shear pin bore 598 in the boom forward end 206. For example, the boom forward attachment fitting 210 may include a shear pin bore 598, and the boom aft attachment fitting 212 may include a shear pin 596. In addition, the boom aft attachment fitting 212 includes a threaded hole 594 oriented approximately parallel to the boom axis 204 and configured to threadably receive the externally-accessible mechanical fastener 592 (FIG. 8) for positively securing the tail boom 202 to the boom interface 230 during field assembly of a tail boom 202 to the wing center module 328.

Referring to FIG. 7-8, shown is the boom forward end 206 configured to be engaged to the boom interface 230. The boom forward end 206 of each tail boom 202 includes a boom forward support 216 and a boom aft support 218 fixedly coupled to the boom forward end 206. The boom forward support 216 and the boom aft support 218 may each be mechanically fastened and/or adhesively bonded to the tail boom 202. A boom cowling 224 may extend between the boom forward support 216 and the boom aft support 218 to structurally stabilize the boom forward end 206. In addition, the boom forward support 216 includes a forwardly-extending shear pin 596 oriented approximately parallel to the boom axis 204. The shear pin 596 of the boom forward support 216 is sized and configured to engage the corresponding shear pin bore 598 formed in the boom forward attachment fitting 210 in a manner preventing movement of the boom forward end 206 along a direction perpendicular to the boom axis 204. The boom aft support may include a shear pin bore 598 for receiving a shear pin 596 extending aftwardly from the boom aft attachment fitting 212. The shear pin 596 for the boom forward support 216 may be sized to provide a clearance fit of 0.005 inch or less (e.g., preferably 0.003 inch) with the shear pin bore 598 formed in the boom forward attachment fitting 210. The shear pin 596 extending aftwardly from the boom aft attachment fitting 212 may be sized to provide a clearance fit of at least 0.005 (e.g., preferably 0.010 inch) with the shear pin bore 598 formed in the boom aft support 218. However, although not shown, the boom interface 230 may be configured such that the shear pin 596 at the forward end of the boom interface 230 extends aftwardly from the boom forward attachment fitting 210 for engaging a shear pin bore 598 formed in the boom forward support 216, and/or the shear pin 596 at the aft end of the boom interface 230 extends forwardly from the boom aft attachment fitting 212 for engaging a shear pin bore 598 formed in the boom aft support 218. Even further, the boom interface 230 may be configured such that the shear pins 596 at both the forward end and aft end of the boom interface 230 face forwardly, or the boom interface 230 may be configured such that the shear pins 596 at both the forward end and aft end of the boom interface 230 face aftwardly.

Referring to FIGS. 5-8, the boom aft support 218 includes a non-threaded hole 593 (FIG. 8) configured to allow the externally-accessible mechanical fastener 592 (FIG. 8) to pass through and engage the threaded hole 594 (FIG. 6) in the boom aft attachment fitting 212 to positively secure the boom aft support 218 to the boom aft attachment fitting 212. As shown in FIGS. 5-6, the boom aft attachment fitting 212 has a wedge-shaped cross-section 214 when viewed from a top-down direction. The wedge-shaped cross-section 214 of the boom aft attachment fitting 212 widens in a forward-facing direction. As shown in FIGS. 7-8, the boom aft support 218 has a pair of flanges 220 arranged in a V shape when viewed from a top-down direction. The pair of flanges 220 define a wedge-shaped internal cavity configured complementary to the wedge-shaped cross-section 214 of the boom aft attachment fitting 212 (FIGS. 5-6) When the mechanical fastener 592 (FIG. 8) is threadably engaged to the threaded hole 594 (FIG. 6) in the boom aft attachment fitting 212 and tightened down, the wedge-shaped cross-section 214 of the boom aft attachment fitting 212 is engaged in direct physical contact with the interior surfaces of the V-shaped flanges 220 (FIGS. 7-8) of the boom aft support 218, thereby preventing lateral movement of the tail boom 202 relative to the wing assembly 300.

Figure 9:
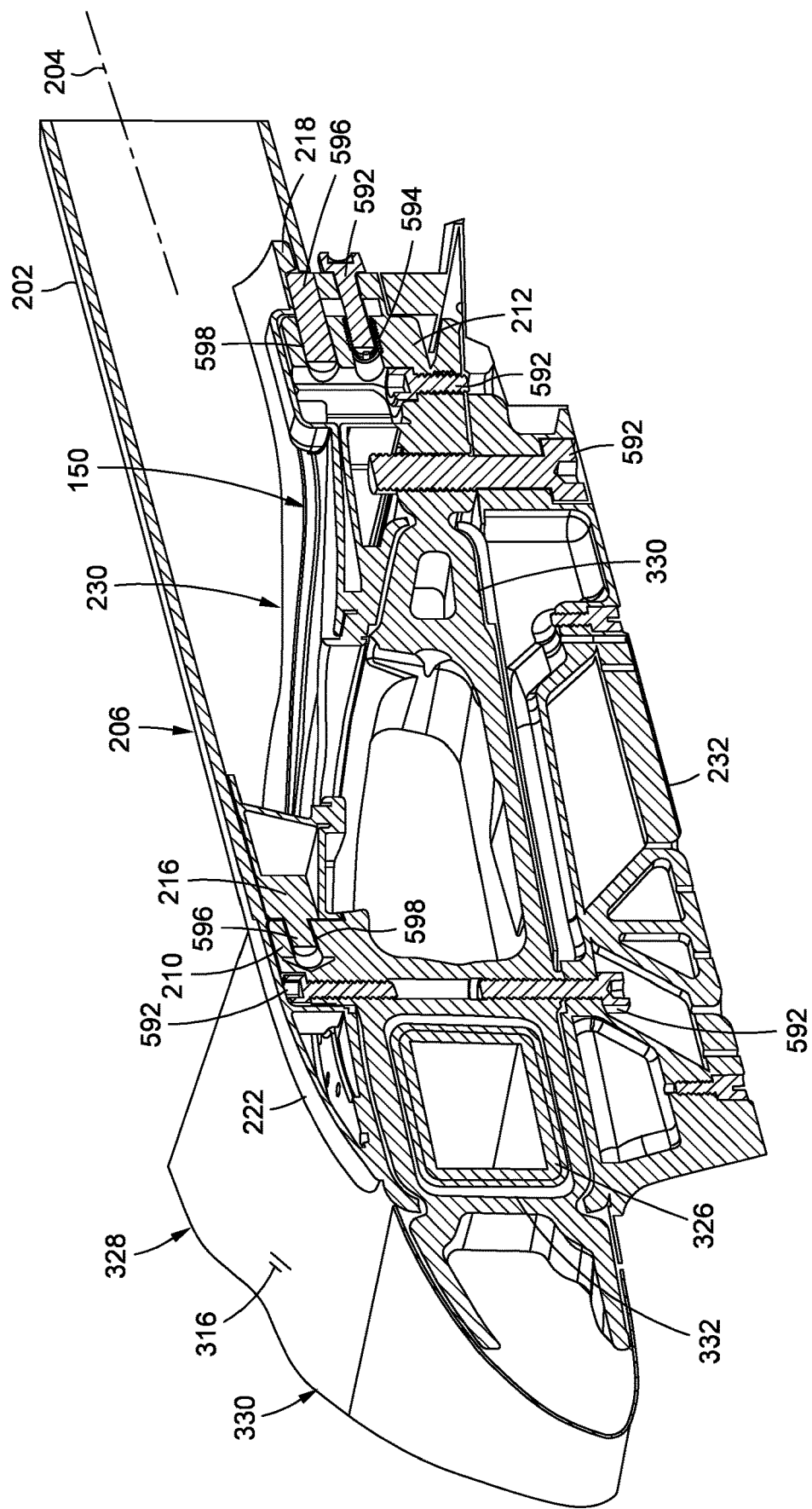
FIG. 9 is a cross-sectional view taken along line 9 of FIG. 3 and illustrating the field joint between the boom forward end and the boom interface of the wing assembly.

Referring to FIG. 9, shown is a cross-sectional view of the boom forward end 206 mated to the boom interface 230. Shown is the externally-accessible mechanical fastener 592 securing the boom aft support 218 to the boom aft attachment fitting 212. In addition, shown are the shear pins 596 engaged within the shear pin bores 598. Each shear pin 596 may have a tapered end to facilitate insertion into a shear pin bore 598. The boom aft attachment fitting 212 and the boom forward attachment fitting 210 protrude above the wing upper surface 316, and are attached to the wing rib 330 using mechanical fasteners 592 (e.g., bolts, Allen head screws, etc.—not shown). Having the boom forward attachment fitting 210 and boom aft attachment fitting 212 protrude above the wing upper surface 316 allows a person assembling the UAV 102 to visually align and insert the shear pin 596 of the boom forward support 216 into the shear pin bore 598 of the boom forward attachment fitting 210 while the shear pin 596 of the boom aft attachment fitting 212 is inserted into the shear pin bore 598 of the boom aft support 218, after which the externally accessible mechanical fastener 592 may be installed to secure the tail boom 202 to the wing center module 328.

Figure 10:
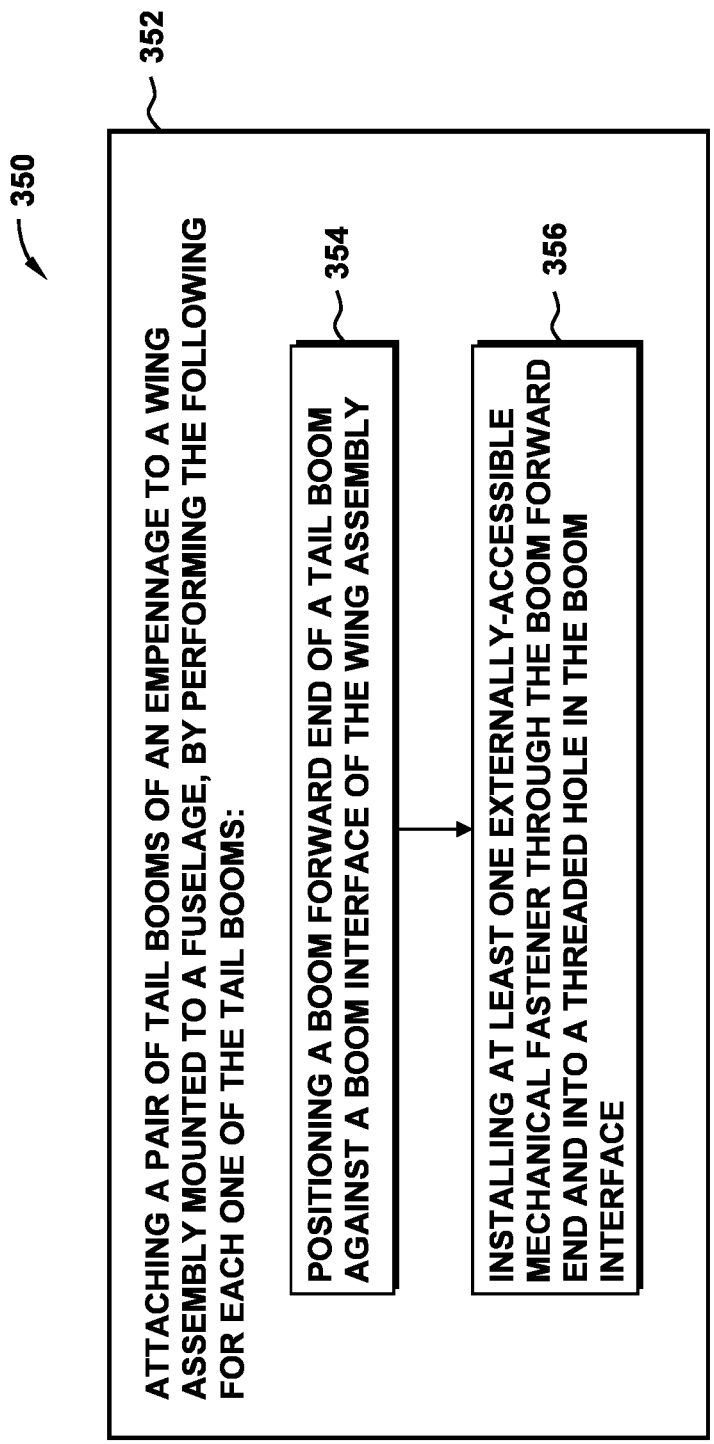
FIG. 10 is a flowchart of operations included in a method of attaching a tail boom to a wing assembly.

Referring to FIG. 10, shown is a flowchart of operations included in a method 350 of enhancing vehicle efficiency in regard to field-attaching each tail boom 202 to a wing assembly 300 of an aircraft 100. Referring to FIGS. 2-9, step 352 of the method 350 includes attaching a pair of tail booms 202 of an empennage 200 to a wing assembly 300. In the example shown, the pair of tail booms 202 may be attached to a wing center module 328 of the wing assembly 300 which may be mounted to the fuselage 104. Prior to or during the attachment of each tail boom 202 to the wing center module 328, any electrical connections (not shown) may be made between the tail boom 202 and the wing center module 328. Each one of the tail booms 202 may be attached to the wing center module 328 by initially performing step 354 of positioning the boom forward end 206 of the tail boom 202 against the boom interface 230 of the wing center module 328. The positioning of the boom forward end 206 against the boom interface 230 may include inserting a shear pin 596 protruding from the boom forward support 216 of the boom forward end 206 into the shear pin bore 598 formed in the boom forward attachment fitting 210 of the boom interface 230 while simultaneously inserting a shear pin 596 protruding from the boom aft attachment fitting 212 of the boom interface 230 into the shear pin bore 598 formed in the boom aft support 218.

As shown in FIGS. 5-6, the boom forward attachment fitting 210 and the boom aft attachment fitting 212 each protrude above the wing upper surface 316 of the wing center module 328 allowing the person assembling the UAV 102 to visually align the shear pins 596 with the shear pin bores 598, as mentioned above. The UAV 102 may be supported on an erectable support stand (not shown) which may optionally be included with one of the transport cases (not shown) in which the tail booms 202, fuselage 104, wings 302, and horizontal tail 228 may be packaged for storage and shipping.

Step 356 of the method 350 includes installing at least one externally-accessible mechanical fastener 592 through the boom forward end 206 and into the threaded hole 594 in the boom interface 230. As shown in FIGS. 8-9, the boom aft attachment fitting 212 includes the threaded hole 594 which is oriented approximately parallel to the boom axis 204. As mentioned above, the boom aft support 218 includes a non-threaded hole 593 through which the externally-accessible mechanical fastener 592 passes prior to engaging the threaded hole 594 in the boom aft attachment fitting 212. The method further includes engaging the wedge-shaped cross-section 214 of the boom aft attachment fitting 212 into direct physical contact with the interior surfaces of the pair of V-shaped flanges 220 of the boom aft support 218 as the externally-accessible mechanical fastener 592 is threadably engaged to the threaded hole 594 and the shear pins 596 are extended further into the shear pin bores 598. The engagement of the shear pins 596 within the shear pin bores 598 and the engagement of the wedge-shaped cross-section 214 of the boom aft attachment fitting 212 with the V-shaped flanges 220 of the boom aft support 218 locks the boom forward end 206 against lateral movement. The engagement of the mechanical fastener 592 into the threaded hole 594 of the boom aft attachment fitting 212 locks the tail boom 202 against forward-aft movement.

Once both of the tail booms 202 are secured to the wing assembly 300, the method 350 may further include coupling the laterally opposite sides of the horizontal tail 228 (FIGS. 1-2) to the vertical tails 226 respectively extending upwardly from the tail booms 202. Although not shown, each one of the vertical tails 226 may include one or more fittings (not shown) configured to receive mechanical fasteners 592 for securing the opposing sides of the horizontal tail 228 to the vertical tails 226, as mentioned above. Prior to or after the attachment of the tail booms 202 to the wing center module 328, the method may include coupling a pair of wings 302 to the laterally opposite sides of the wing center module 328. For example, as shown in FIG. 2, each wing 302 may be joined to the wing center module 328 by inserting a joiner spar 326 protruding from each wing 302 into a joiner spar pocket 332 incorporated into the wing rib 330 on each of laterally outboard sides of the wing center module 328. As described below, the wing center module 328 may be configured to be coupled to the fuselage 104 in a manner allowing forward-aft adjustment of the location of the wing center module 328 relative to the fuselage 104.

Figure 11:
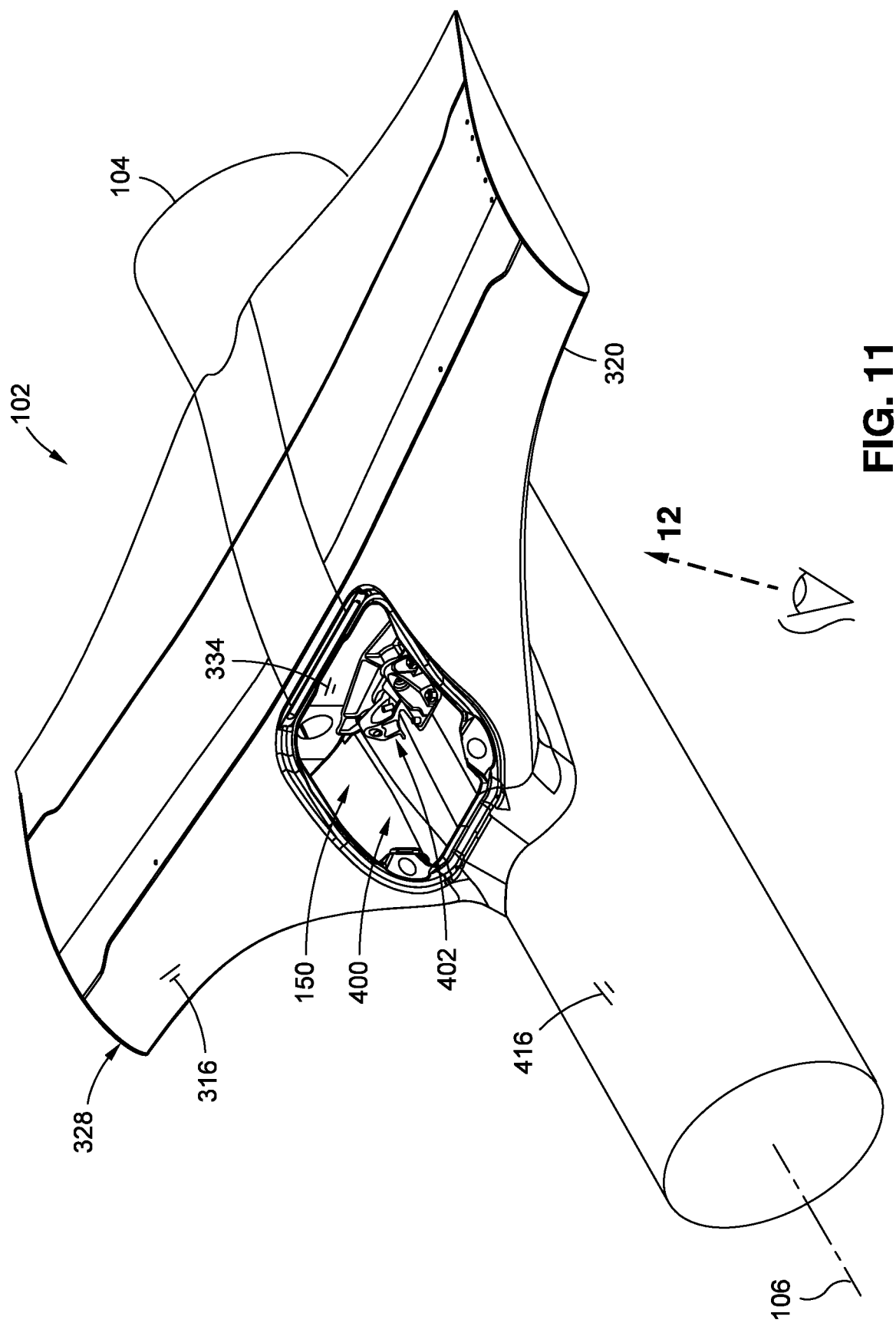
FIG. 11 is a perspective view of an example of a wing center module of a wing assembly mounted to a fuselage of the UAV.
Figure 12:
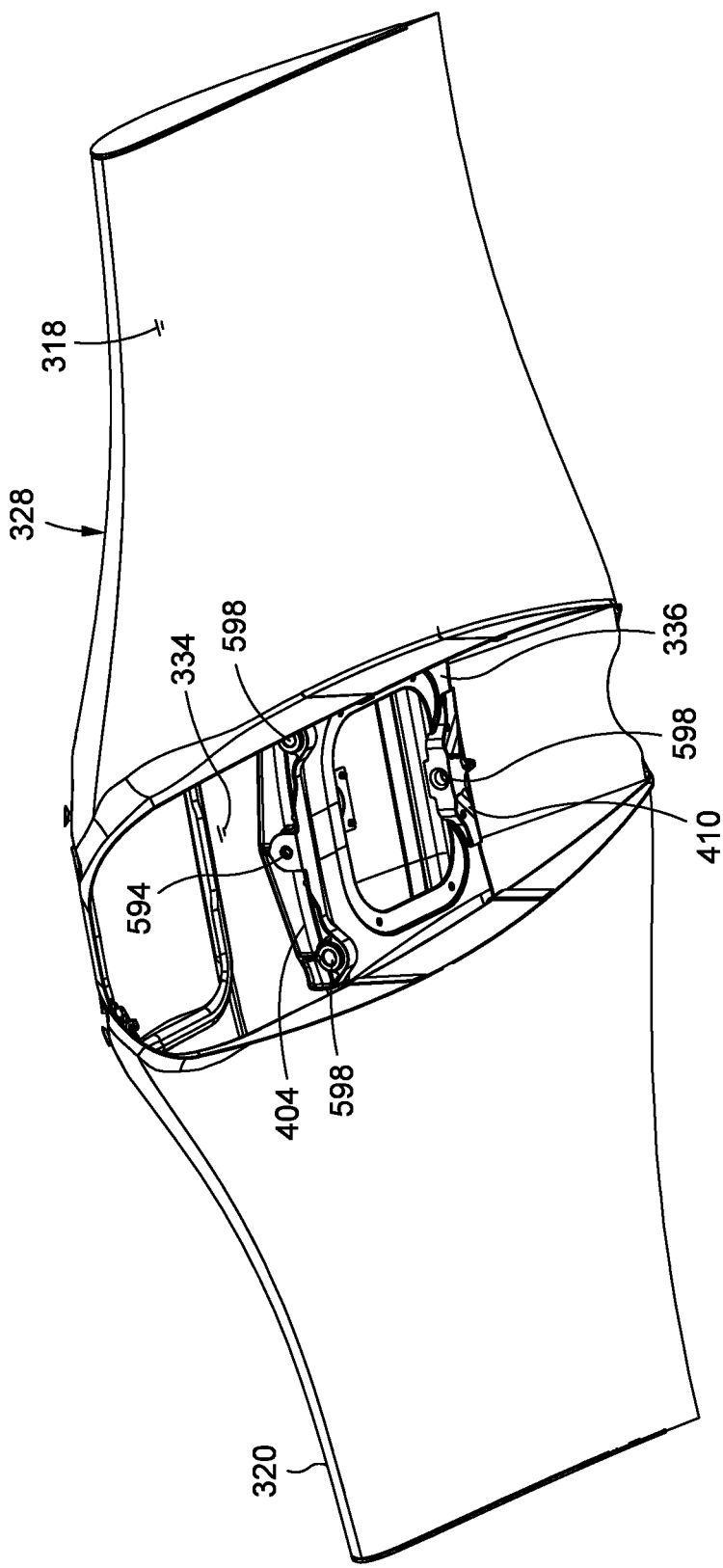
FIG. 12 is a perspective view of an underside of the wing center module taken along line 12 of FIG. 11 and illustrating a wing forward fitting and a wing aft fitting fixedly mounted respectively to a front spar and a rear spar of the wing center module.
Figure 16:
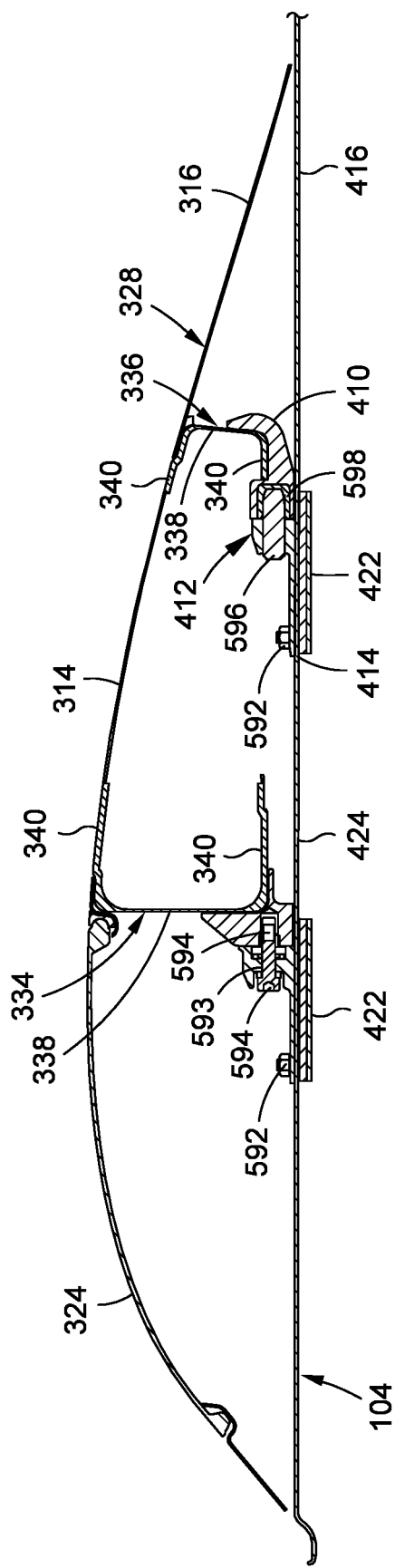
FIG. 16 is a sectional view taken along line 16 of FIG. 15 and illustrating the wing forward fitting and the wing aft fitting respectively coupled to the fuselage forward fitting and the fuselage aft fitting.

Referring to FIGS. 11-12, shown is an example of a wing center module 328 attached to the fuselage 104. The wing center module 328 may be covered by a wing skin 314 which may include a forward hatch 324 (FIG. 16). The forward hatch 324 may be removed in the field to allow access to the wing-fuselage interface 400 coupling the wing center module 328 to the fuselage 104. FIG. 12 shows an underside of the wing center module 328 and illustrating the wing-fuselage interface 400. The wing-fuselage interface 400 may include a wing forward fitting 404 and a wing aft fitting 410 respectively fixedly coupled to a front spar 334 and rear spar 336 of the wing center module 328.

Figure 13:
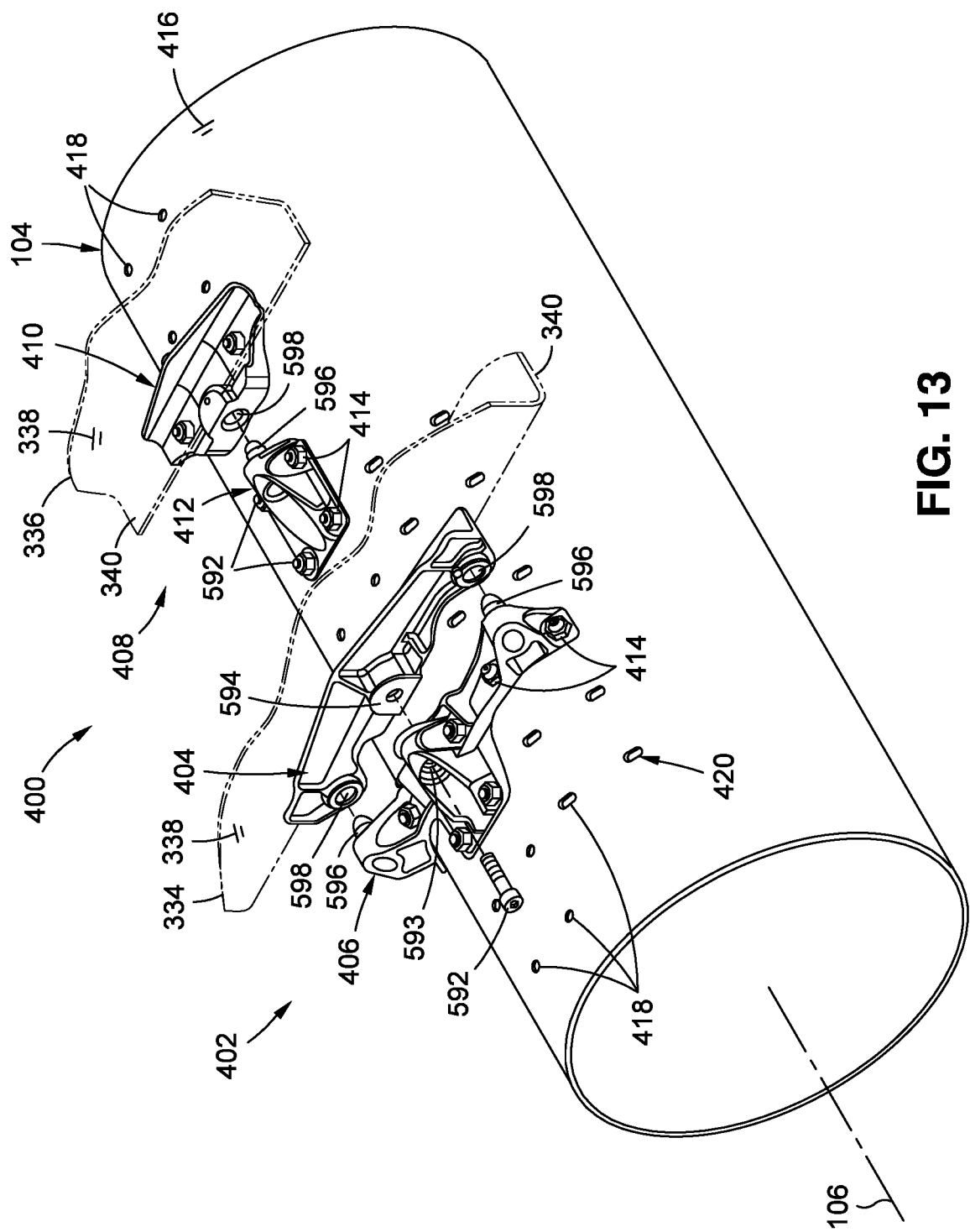
FIG. 13 is a top-down perspective view of a field joint between the wing center module and the fuselage and showing the wing forward fitting and wing aft fitting in a disassembled state relative to a fuselage forward fitting and a fuselage aft fitting mounted to selected fuselage holes formed in a hole pattern in the fuselage skin.
Figure 14:
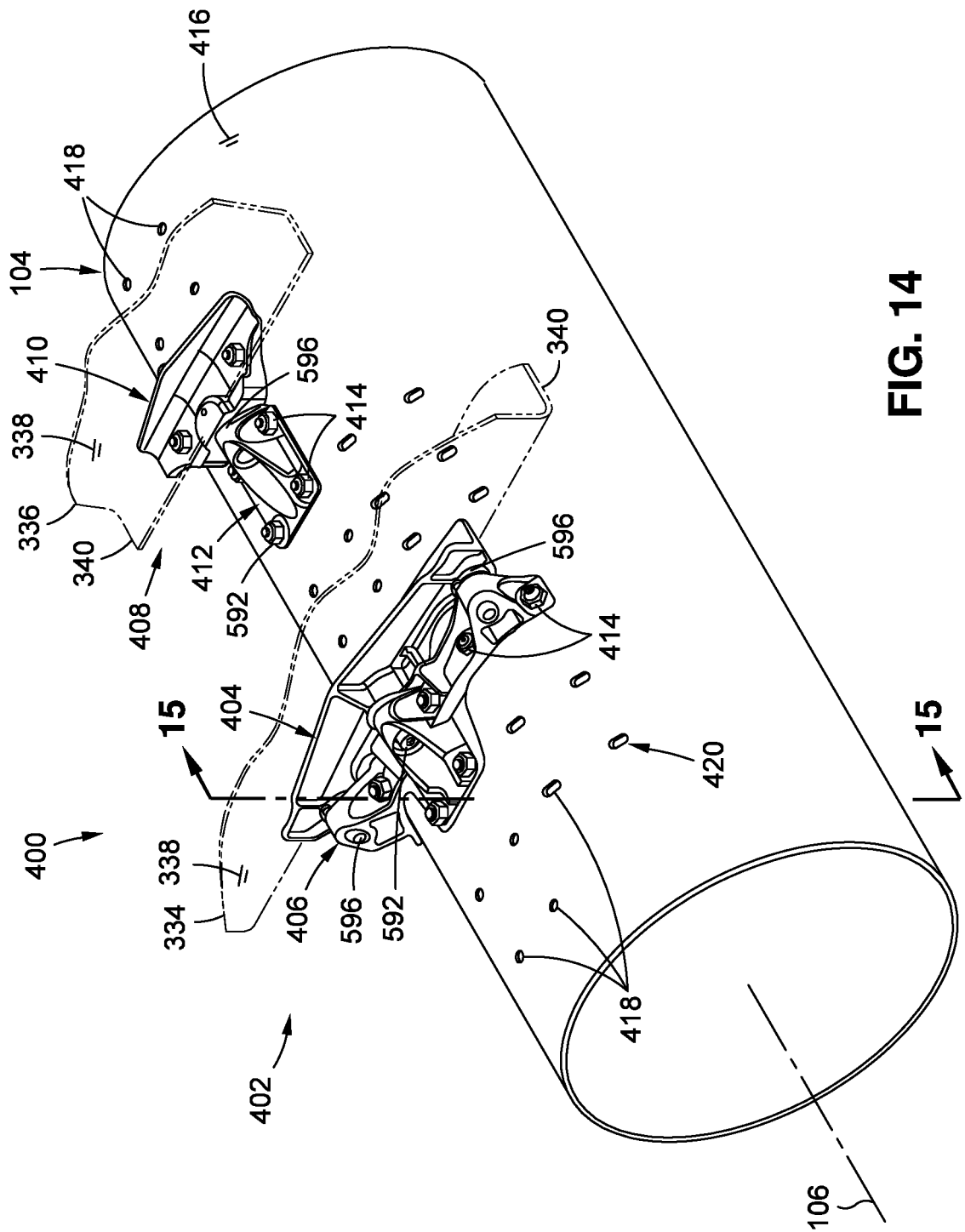
FIG. 14 is a top-down perspective view of the wing forward fitting and the wing aft fitting respectively coupled to a fuselage forward fitting and a fuselage aft fitting.

Referring to FIGS. 13-14, shown is a forward fitting assembly 402 and an aft fitting assembly 408 of the wing-fuselage interface 400. The forward fitting assembly 402 includes a wing forward fitting 404 and a fuselage forward fitting 406. The wing forward fitting 404 is configured to be removably coupled to the fuselage forward fitting 406. Similarly, the aft fitting assembly 408 includes the wing aft fitting 410 and a fuselage aft fitting 412. The wing aft fitting 410 is configured to be removably coupled to the fuselage aft fitting 412. In FIG. 13-14, the wing skin 314 of the wing center module 328 is omitted and the front spar 334 and rear spar 336 are shown in phantom to illustrate the connection of the wing forward fitting 404 and wing aft fitting 410 respectively to the front spar 334 and rear spar 336.

In FIGS. 13-14, the fuselage forward fitting 406 and fuselage aft fitting 412 may be mounted to the fuselage 104 at a fixed spacing complementary to the spacing between the front spar 334 the rear spar 336. The fuselage forward fitting 406 and the fuselage aft fitting 412 having fitting holes 414 configured to be aligned with fuselage holes 418 formed in a hole pattern 420 of circumferentially-spaced holes and axially-spaced holes in the fuselage skin 416. The hole pattern 420 is complementary to the spacing between the fitting holes 414 in the fuselage forward fitting 406 and fuselage aft fitting 412. As described in greater detail below, mechanical fasteners 592 (e.g., threaded fasteners—bolts, screws, PEM™ studs, etc.) are extended through the fuselage skin 416 and through the fitting holes 414 and are secured with internally-threaded receptacles such as hex-head nuts for coupling the forward fitting assembly 402 and the aft fitting assembly 408 to the top of the fuselage 104.

On each side of the top-center of the fuselage 104, the two laterally outermost columns of circumferentially-spaced fuselage holes 418 may be slotted in a circumferential direction to facilitate installation of the mechanical fasteners 592 that are extended through the fuselage skin 416 and laterally outboard fitting holes 414. In an embodiment, the mechanical fasteners 592 may be installed from an interior (FIG. 17) of the fuselage 104. Access to the fuselage interior may be provided by removing the propulsion pod 110 from the fuselage 104 aft end. The hole pattern 420 in the fuselage skin 416 allows for positioning of the wing center module 328 at one of a variety of forward-aft locations as a means to maintain the aircraft center of gravity (not shown) of the UAV 102 within a predetermined range of the center of lift (not shown). In this regard, the wing assembly 300 may be mounted at a forward-aft location that is complementary to the payload mass distribution within the fuselage 104, and which may vary for different types of missions performed by the UAV 102.

Figure 15:
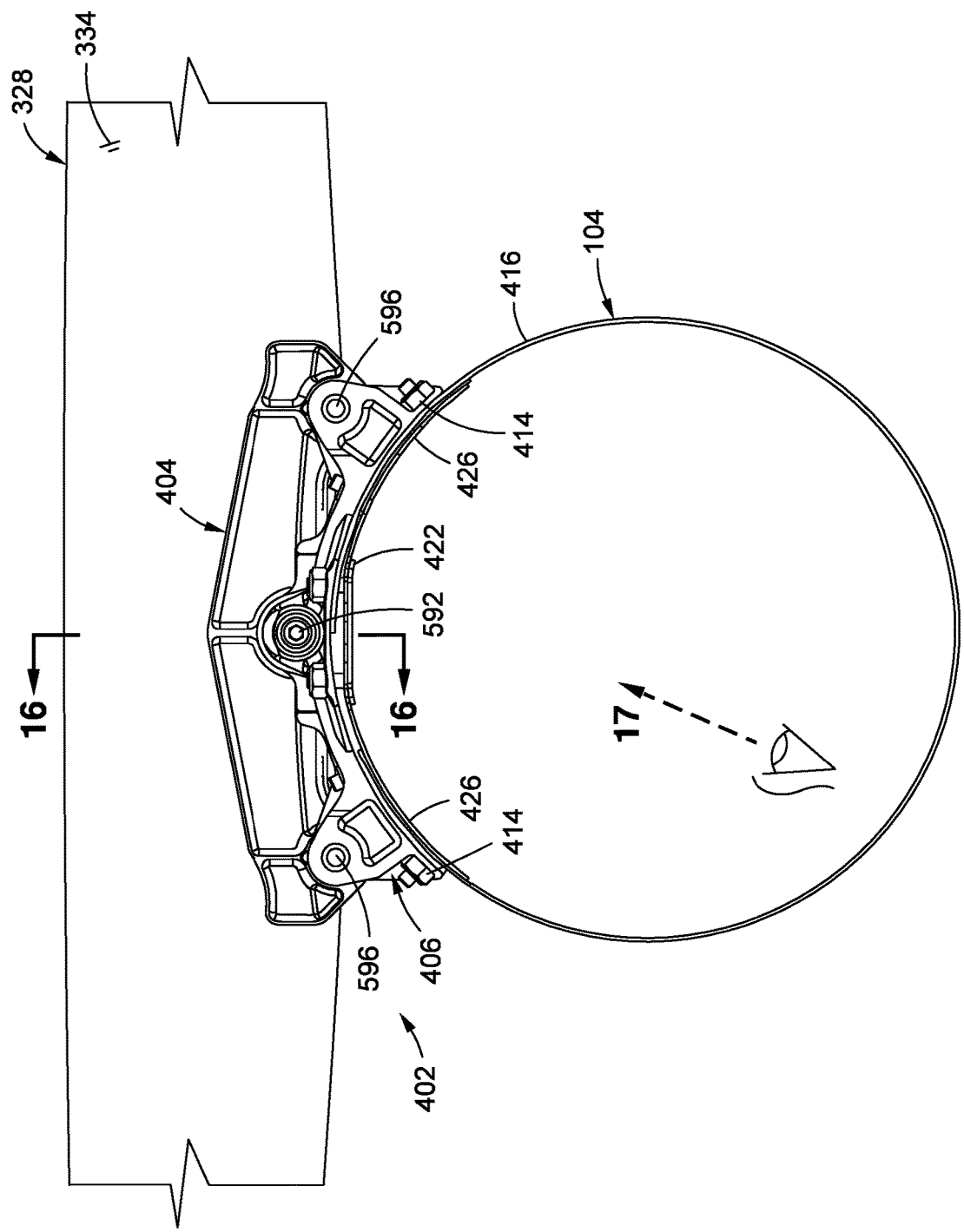
FIG. 15 is a sectional view taken along line 15 of FIG. 14 and illustrating a pair of shear pins and a mechanical fastener for coupling the fuselage forward fitting to the wing forward fitting.

As shown in FIG. 13-15, the fuselage forward fitting 406 includes a pair of laterally-spaced shear pins 596 on opposite sides of a centrally-located threaded hole 594 as part of the field joint 150 between the wing center module 328 and the fuselage 104. In the example shown, the shear pins 596 of the fuselage forward fitting 406 are aft facing and each have a pin axis oriented approximately parallel to the aircraft longitudinal axis 106. The wing forward fitting 404 includes a pair of shear pin bores 598 configured to receive the shear pins 596 of the fuselage forward fitting 406. The fuselage aft fitting 412 includes a centrally-located and aft-facing shear pin 596 configured to be inserted into a shear pin bore 598 in the wing aft fitting 410 as part of the field joint 150 between the wing center module 328 and the fuselage 104. In addition, the fuselage forward fitting 406 includes a non-threaded hole 593 configured to receive a mechanical fastener 592 for engaging the threaded hole 594 in the wing forward fitting 404 once the shear pins 596 of the fuselage forward and aft fittings 406, 412 are engaged with the shear pin bores 598 of the respective wing forward and aft fittings 404, 410. The mechanical fastener 592 may be installed by first removing the forward hatch 324 (FIG. 16) to allow access to the interior of the wing center module 328. The engagement of the mechanical fastener 592 with the threaded hole 594 in the wing forward fitting 404, and the engagement of the shear pins 596 of the fuselage forward and aft fittings 406, 412 with the shear pin bores 598 in the wing forward and aft fittings 404, 410 secures the wing center module 328 to the fuselage 104 in a manner preventing fore-aft translation, lateral translation, and lateral pivoting of the wing center module 328 relative to the fuselage 104.

Referring to FIG. 16, shown is a sectional side view of the wing-fuselage interface. As mentioned above, the wing center module 328 includes a front spar 334 which may have a C-shaped cross-section, and a rear spar 336 which may also have a C-shaped cross-section. Although not shown in the figures, the front spar 334 and the rear spar 336 each extend between the wing ribs 330 (FIG. 9) located on laterally opposite sides of the wing center module 328. In FIG. 16, the wing forward fitting 404 and the wing aft fitting 410 each have an L-shaped cross-section coupled to a vertical web 338 and a lower flange 340 of the C-shaped cross-section of the respective front spar 334 and rear spar 336. The wing forward fitting 404 may be mechanically fastened to and/or adhesively bonded to the front spar 334. Likewise, the wing aft fitting 410 may be mechanically fastened to and/or adhesively bonded to the rear spar 336. As described above, the fuselage forward fitting 406 is coupled to the wing forward fitting 404 by a mechanical fastener 592. In addition, as mentioned above, the fuselage forward fitting 406 includes a pair of shear pins 596 receivable within shear pin bores 598 formed in the wing forward fitting 404. Similarly, the fuselage aft fitting 412 includes at least one shear pin 596 that is receivable within a shear pin bore 598 formed in the wing aft fitting 410. However, the wing-fuselage interface 400 may be configured in an alternative embodiment wherein the shear pins 596 protrude from the wing forward and aft fittings 404, 410 and are received within shear pin bores 598 formed in the respective fuselage forward and aft fittings 406, 412.

Figure 17:
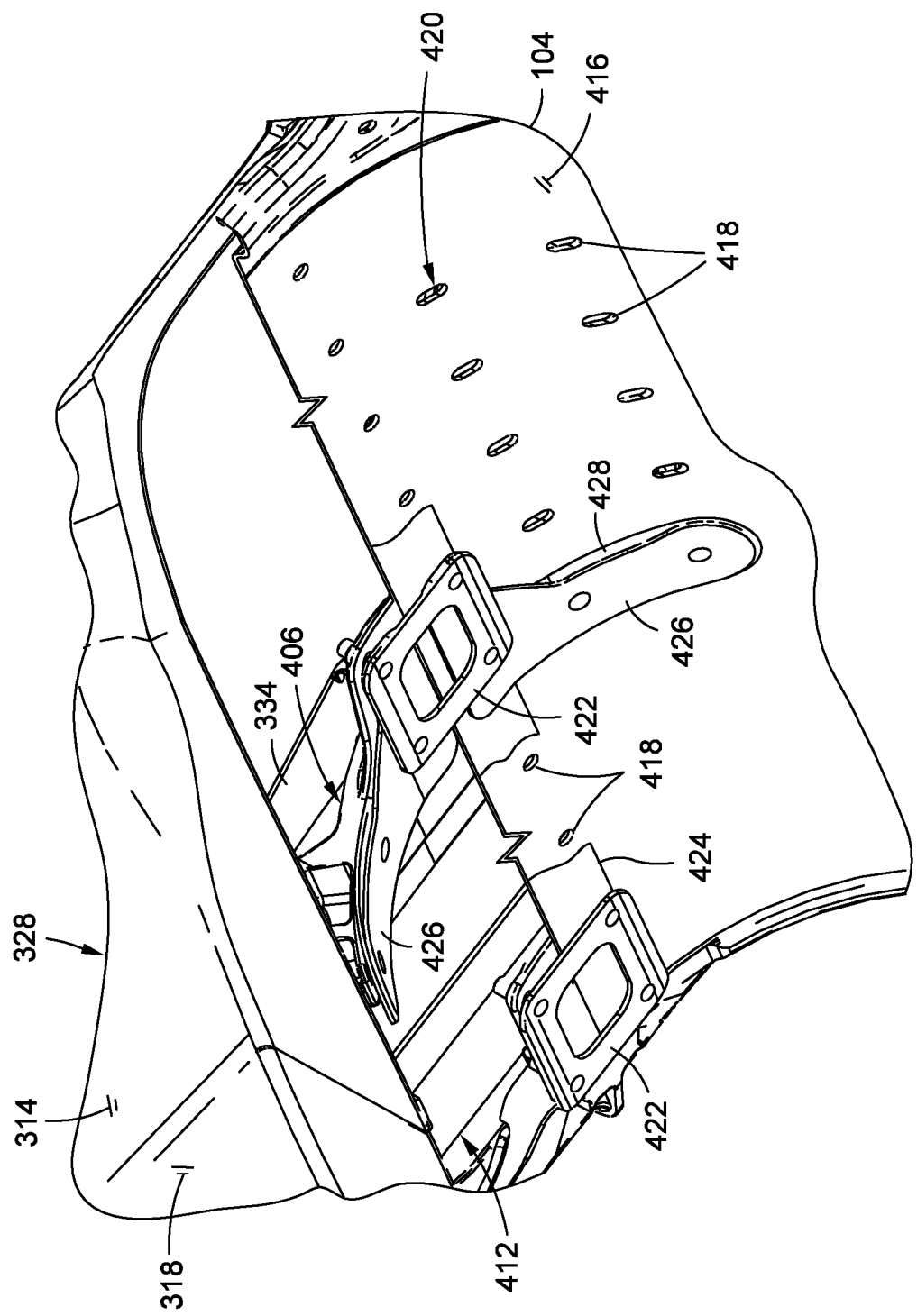
FIG. 17 is a bottom-up perspective view of an interior of the fuselage taken along line 17 of FIG. 15 and illustrating a pair of central stud plates for respectively coupling the fuselage forward fitting and the fuselage aft fitting to the fuselage skin.

FIG. 17 shows the interior of the fuselage 104 at the location of the wing-fuselage interface 400. A portion of the fuselage skin 416 is omitted to show the forward fitting assembly 402 and the aft fitting assembly 408 respectively coupling the front spar 334 and rear spar 336 of the wing center module 328 to the fuselage skin 416. A fuselage mount slide plate 424 may be positioned in direct physical contact with the interior surface of the fuselage skin 416 at the top center of the fuselage 104. The fuselage mount slide plate 424 may extend along a lengthwise direction of the fuselage 104, and may include holes (e.g., circular holes) that are sized and spaced complementary to the two rows of fuselage holes 418 (e.g., circular holes) at the top-center of the fuselage 104. For each of the fuselage forward fitting 406 and fuselage aft fitting 412, the wing-fuselage interface may optionally include a central stud plate 422 positioned on an interior side of the fuselage mount slide plate 424. In the example shown, each one of the central stud plates 422 includes four (4) mechanical fasteners 592 complementary to four (4) fitting holes 414 in the fuselage forward fitting 406 and in the fuselage aft fitting 412. However, each central stud plate 422 may include any quantity of mechanical fasteners 592 for installation into a corresponding quantity of fitting holes 414 in the fuselage forward fitting 406 and fuselage aft fitting 412. In some embodiments, the heads of the mechanical fasteners 592 may be permanently fixed to the central stud plate 422 to minimize the total quantity of loose parts required for fastening the wing center module 328 to the fuselage 104. The mechanical fasteners 592 in each central stud plate 422 are spaced complementary to the spacing between the fitting holes 414 in the fuselage skin 416 which, in turn, are complementary to the spacing between the fitting holes 414 in each of the fuselage forward fitting 406 and fuselage aft fitting 412.

In FIG. 17, for the fuselage aft fitting 412, the central stud plate 422 may be positioned directly against the interior surface of the fuselage mount slide plate 424. For the fuselage forward fitting 406, the wing-fuselage interface 400 may include a sway stud plate 426 on each of laterally opposite sides of the fuselage 104. Each one of the sway stud plates 426 may include mechanical fasteners 592 that are spaced complementary to the circumferential spacing of the slotted fuselage holes 418. The heads of the mechanical fasteners 592 in the sway stud plates 426 may be permanently fixed to the sway stud plates 426 as a means to minimize the total quantity of loose parts required for attaching the wing center module 328 to the fuselage 104. A sway pad 428 formed of resiliently compressible material (e.g., rubber) may be installed between each sway stud plate 426 and the fuselage skin 416. The sway pads 428 may provide cushioning of the sway stud plate 426 against the fuselage skin 416 and may also prevent lateral pivoting of the fuselage 104 relative to the wing assembly 300 during flight as may otherwise occur due to movement of the mechanical fasteners in the circumferentially-slotted holes in the fuselage skin 416.

Figure 18:
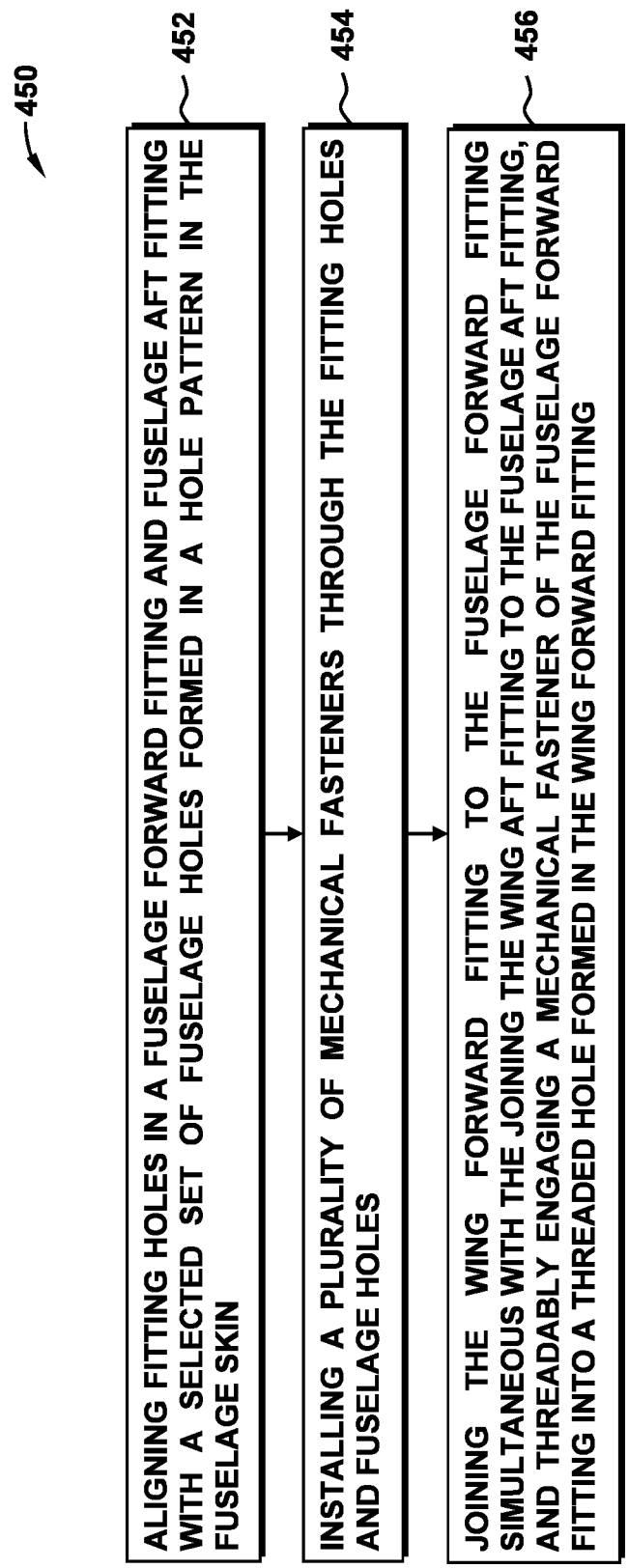
FIG. 18 is a flowchart of operations included in a method of attaching the wing assembly to the fuselage.

FIG. 18 is a flowchart of operations in a method 450 of enhancing a detachable wing assembly 300 in regard to field-attaching the wing assembly 300 to a fuselage 104. Step 452 of the method 450 includes aligning the fitting holes 414 in the fuselage forward fitting 406 and fuselage aft fitting 412 with a selected set of the fuselage holes 418 formed in a hole pattern 420 in the fuselage skin 416 as shown in FIGS. 13-14. As described above, the hole pattern 420 in the fuselage skin 416 allows for forward-aft adjustment of the mounting location of the wing assembly 300 relative to the fuselage 104 as a means to maintain the aircraft center of gravity within a predetermined range of the aircraft center of lift.

Step 454 of the method 450 includes installing a plurality of mechanical fasteners 592 through the fitting holes 414 and fuselage holes 418 to secure the fuselage forward fitting 406 and fuselage aft fitting 412 to the fuselage 104. In the example shown in FIGS. 13-17, the mechanical fasteners 592 extend from the interior of the fuselage 104 toward the exterior the fuselage 104 such that internally threaded nuts may be threadably engaged the threaded ends of the mechanical fasteners 592 protruding from the fitting holes 414 of the fuselage forward fitting 406 and fuselage aft fitting 412. In FIG. 17, the heads of the mechanical fasteners 592 may be fixedly coupled to a pair of central stud plates 422 located on the interior of the fuselage 104. Likewise, the heads of mechanical fasteners 592 may be fixedly coupled to the pair of sway stud plates 426 that may be mounted on the interior of the fuselage 104 for coupling the fuselage forward fitting 406 to the fuselage skin 416. However, the orientation of one or more of the mechanical fasteners may be reversed.

As shown in FIG. 17, the mechanical fasteners 592 may be installed from the fuselage interior, access to which may be provided by removing the propulsion pod 110 located on the aft end of the fuselage 104. The mechanical fasteners 592 protruding from each sway stud plate 426 may pass through a sway pad 428, the fuselage skin 416, and the fitting holes 414 of the fuselage forward fitting 406. The mechanical fasteners 592 protruding from the central stud plate 422 for the fuselage aft fitting 412 may pass through the fuselage mount slide plate 424 (FIG. 17), the fuselage skin 416, and the fitting holes 414 of the fuselage aft fitting 412. The mechanical fasteners 592 protruding from the central stud plate 422 for the fuselage forward fitting 406 may pass through the fuselage mount slide plate 424, the sway stud plate 426, the fuselage skin 416, and the fitting holes 414 of the fuselage forward fitting 406.

Step 454 of the method 450 includes joining the wing forward fitting 404 to the fuselage forward fitting 406 simultaneous with the joining of the wing aft fitting 410 to the fuselage aft fitting 412 using the above-described shear pin bores 598 and the mechanical fastener 592, as shown in FIGS. 13-14. In this regard, the method includes inserting a laterally-spaced pair of shear pins 596 protruding from the wing forward fitting 404 into a corresponding pair of shear pin bores 598 formed in the fuselage forward fitting 406 while simultaneously inserting a centrally-located shear pin 596 protruding from the fuselage aft fitting 412 into a shear pin bore 598 formed in the wing aft fitting 410. The method further includes threadably engaging a mechanical fastener 592 of the fuselage forward fitting 406 into a threaded hole 594 formed in the wing forward fitting 404 to mechanically fasten the fuselage forward fitting 406 to the wing forward fitting 404, as shown in FIGS. 13-15.

Figure 19:
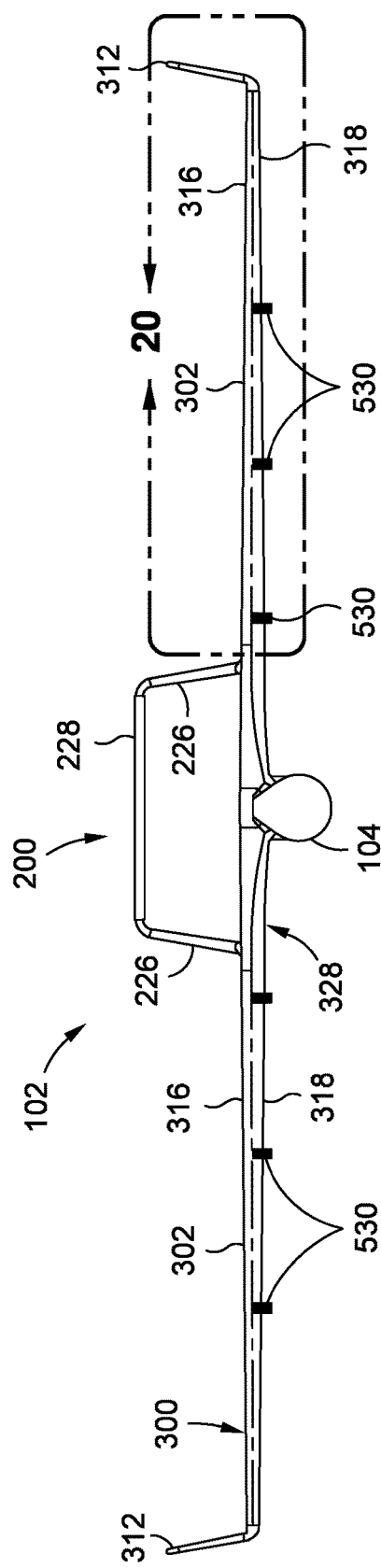
FIG. 19 is an aft-looking view of an example of the UAV of FIG. 1.
Figure 20:
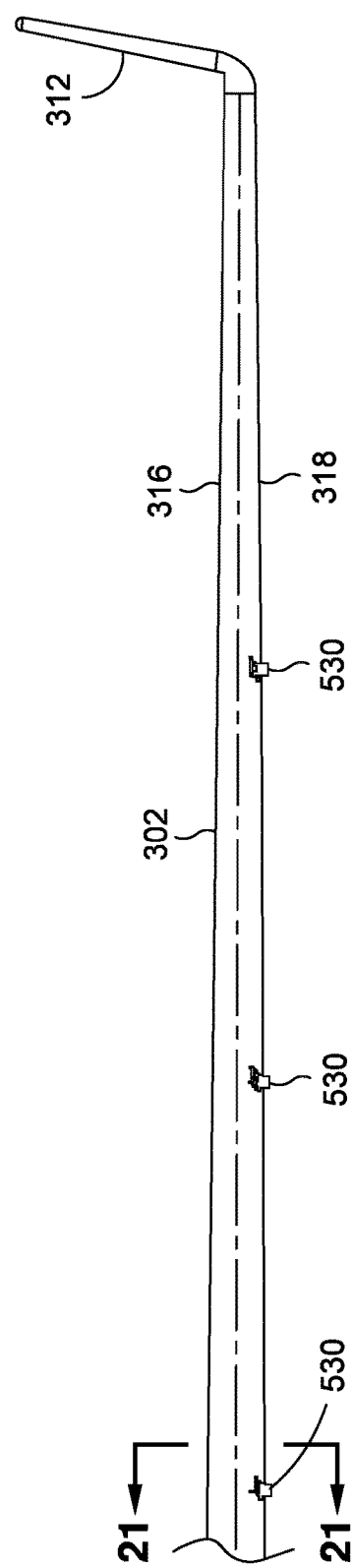
FIG. 20 is a magnified aft-looking view of a wing of the UAV of FIG. 19.

Referring now to FIG. 19, shown is a front view of the UAV 102 of FIGS. 1-2, and illustrating the wing assembly 300 comprising a pair of wings 302 each extending outwardly from the wing center module 328 and terminating at a winglet 312. The wing assembly 300 has a relatively high aspect ratio of wing span (e.g., approximately 13 feet) to average wing chord 306 (FIG. 21—approximately 9-12 inches). Advantageously, each one of the wings 302 includes a slotted flap 500 (FIGS. 19-20) which, in combination with the winglets 312 and the relatively large wing area, provides for a relatively high gross takeoff weight (e.g., approximately 75 pounds) with an approximate 15 pound payload capacity. Each one of the flaps 500 is pivotably coupled to the wing 302 by a plurality of flap hinge assemblies 530 collectively defining a flap pivot axis 558 (FIG. 24) that is external to the wing lower surface 318. In the present example, each flap 500 extends in a spanwise direction along approximately the inboard two thirds of the length of each wing 302 as measured from a lateral side of the wing center module 328 to the start of the winglet 312.

FIG. 21 is a cross-sectional view of one of the wings 302 which has a wing upper surface 316, a wing lower surface 318, a wing leading edge 320, and a wing aft portion 322. The flap 500 is pivotally coupled to the wing aft portion 322, and has a flap upper surface 502, a flap lower surface 504, a flap leading edge 506, and a flap trailing edge 508. The wing 302 and flap 500 collectively define an airfoil section 304 which has a Reynolds number of no greater than 1.5 million. In the example shown, the flap chord (not shown—measured from the flap leading edge 506 to the flap trailing edge 508) is approximately 25% (e.g., ±2%) of the wing chord 306 which extends from the wing leading edge 320 to the flap trailing edge 508 when the flap 500 is in the neutral position 516.

Each one of the wings 302 may include a cove strip 510 mounted to the wing aft portion 322. The cove strip 510 has a cove strip upper surface 512 and a cove strip lower surface 514. In the example shown, the cove strip upper surface 512 is approximately flush with the wing upper surface 316 at an aftmost point of the wing aft portion 322. When the flap 500 is in the neutral position 516 as shown in FIG. 21, the cove strip upper surface 512 is also approximately flush with the flap upper surface 502. The cove strip 510 may extend aftwardly over a portion of the flap upper surface 502. The cove strip lower surface 514 may be contoured complementary to the flap leading edge 506. The cove strip lower surface 514 is contoured such that when the flap 500 is in the neutral position 516, oncoming air flowing along the wing lower surface 318 is prevented from flowing upwardly between the wing aft portion 322 and the flap leading edge 506.

In FIG. 22, the wing 302 is oriented at an angle of attack 310 relative to the flow direction 308 of oncoming airflow. The flap 500 may have a flap deflection travel of 10° upward deflection and 30° downward deflection relative to the orientation of the flap 500 in the neutral position 516. However, the flap deflection travel may be more or less than 10° upward deflection and/or more or less than 30° downward deflection. When the flap 500 is in a downwardly deflected position 518 as shown, a slot 520 opens up between the flap leading edge 506 and the wing aft portion 322. The slot 520 allows air from the wing lower surface 318 to flow upwardly through the slot 520 after which the air is redirected by the cove strip 510 aftwardly along the flap upper surface 502. At high angles of attack 310, the flow of air through the slot 520 and over the flap upper surface 502 may reduce airflow separation over the flap upper surface 502, resulting in an increase in the maximum lift coefficient $CL_{max}$ relative to the maximum lift coefficient $CL_{max}$ for the same wing 302 with a non-slotted flap or with no flaps.

For the airfoil section 304 of FIGS. 21-22, the maximum lift coefficient $CL_{max}$ may increase up to a predetermined downward deflection angle 524 (e.g., 30°) of the flap 500. At downward deflection angles 524 of greater than 30°, the flaps 500 generate increased aerodynamic drag with a minimal or negligible increase in maximum lift coefficient $CL_{max}$, which allows for steep descent gradients while the UAV 102 is on approach from the service ceiling (e.g., up to 15,000 feet). The combination of air flow through the slots 520 coupled with the relatively large wing area (i.e., low wing loading) allows for a reduction in the airspeed of the UAV 102 during recovery, such as using the aircraft recovery system 600 shown in FIG. 34 and described below. The reduction in airspeed during UAV recovery may correspond to a reduction in the total amount of capture energy that must be absorbed by the recovery system, thereby avoiding the need to modify an existing recovery system configured to recover lighter weight and/or slower flying UAVs. For example, the presently-disclosed slotted flaps 500 may reduce the total capture energy by approximately 25% relative to the total capture energy of the same UAV lacking flaps.

When the slotted flap 500 of each wing 302 is in a downwardly deflected position 518 of 30°, the airfoil section 304 provides a maximum lift coefficient $CL_{max}$ that is at least 30% (e.g., up to 46%) greater than the maximum lift coefficient $CL_{max}$ of the same airfoil section without flaps. The airfoil section 304 may have a maximum lift coefficient $CL_{max}$ in the range of approximately 1.5 to 2.3 respectively corresponding to an angle of attack 310 of 0° and 11° for a Reynolds number of approximately 500,000 and an airspeed of approximately Mach 0.07. The airfoil section 304 of the wings 302 has an airfoil thickness ratio in the range of approximately 10-14% (e.g., ±2%) of the chord length, which may be in the range of approximately 9-12 inches (e.g., ±1 inch). The relatively low flight speeds (e.g., 30-80 knots) and relatively small chord length (e.g., 9-12 inches) dictates operation of the UAV 102 in Reynolds number flows of no greater than 1.5 million. The wing assembly 300 is configured such that a lower end design limit Reynolds number of 200,000 occurs at a stall speed of approximately 35 knots at a density altitude of approximately 6,000 feet above sea level. For typical cruising conditions, the airspeed of the UAV 102 is approximately 44 knots at a density altitude of approximately 3,000 feet. In cruise flight (e.g., flaps in neutral position—FIG. 22), the Reynolds number may be in the range of 300,000-400,000.

Figure 23:
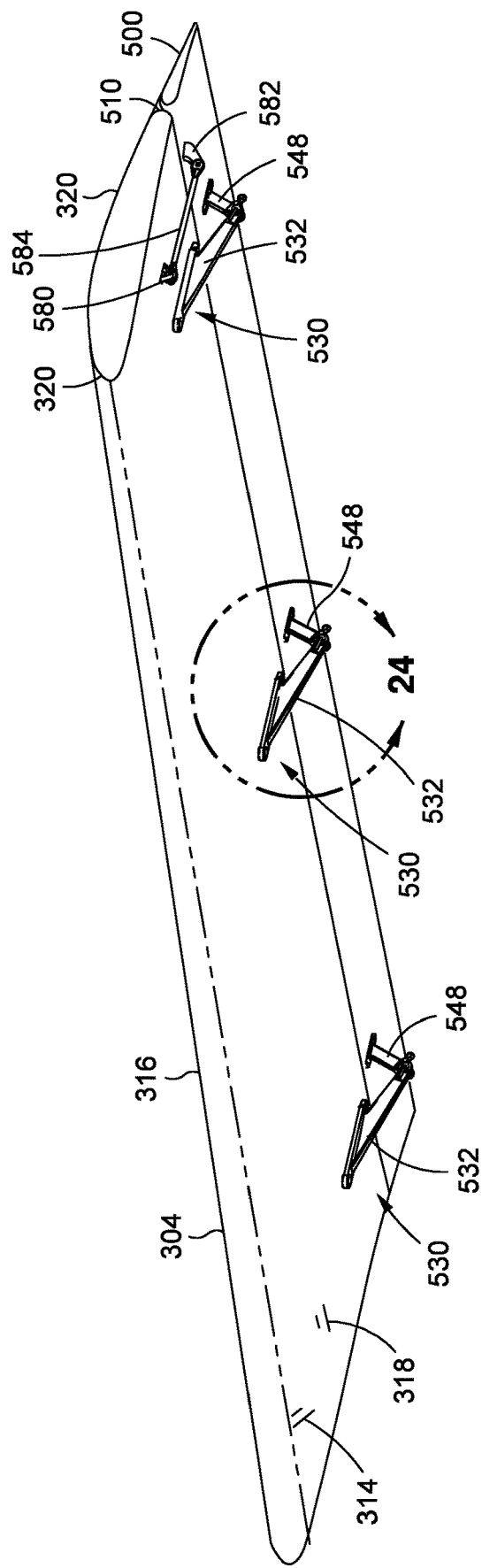
FIG. 23 is a bottom-up perspective view of a portion of the wing illustrating a plurality of flap hinge assemblies for coupling the flap to the wing lower surface.

Referring to FIG. 23, shown is a perspective view of an underside of a wing 302 of the UAV 102 showing a plurality of generally uniformly-spaced flap hinge assemblies 530 coupling the slotted flap 500 to the wing lower surface 318. Each one of the flap hinge assemblies 530 is configured as a drop hinge in which the flap pivot axis 558 (FIG. 24) is located below the wing lower surface 318 and which results in the slot 520 (FIG. 22) opening up between the wing aft portion 322 and the flap leading edge 506 when the flap 500 is deflected downwardly.

Figure 24:
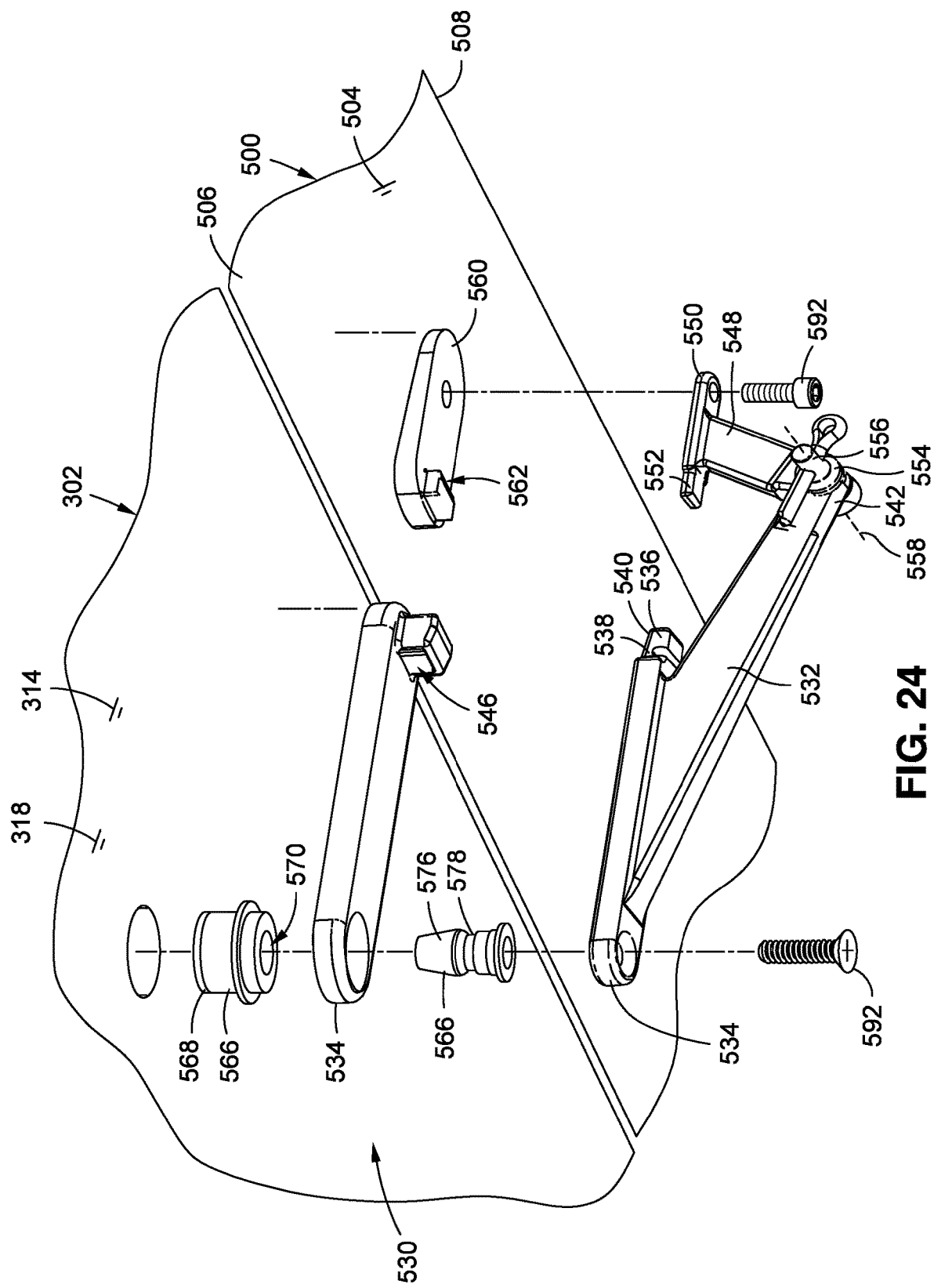
FIG. 24 is an exploded view of one of the flap hinge assemblies taken along section circle 24 of FIG. 23 and illustrating a hinge bracket and a flap bracket respectively couplable to the wing lower surface and flap lower surface via a respective hinge bracket pad and flap bracket pad.

FIG. 24 is an exploded view of an example of a flap hinge assembly 530. The flap hinge assembly 530 includes a hinge bracket 532 and a flap bracket 548. The hinge bracket 532 is coupled to the wing lower surface 318 and the flap bracket 548 is coupled to the flap lower surface 504. In some examples, the hinge bracket 532 may be releasably coupled to the wing lower surface 318 by means of at least one releasable connector 566 as described below. Additionally, the flap bracket 548 may be releasably coupled to the flap lower surface 504. Although FIGS. 24-28 shown both the hinge bracket 532 and the flap bracket 548 as being releasably coupled respectively to the wing lower surface 318 and flap lower surface 504, in a preferred embodiment, either the hinge bracket 532 or the flap bracket 548 is releasably attached. For example, either the hinge bracket 532 is releasably coupled to the wing lower surface 318 and the flap bracket 548 is non-releasably coupled to the flap lower surface 504, or the hinge bracket 532 is non-releasably coupled to the wing lower surface 318 and the flap bracket 548 is releasably coupled to the flap lower surface 504.

In FIG. 24, the hinge bracket 532 includes a hinge bracket pad 544 optionally mounted between the hinge bracket 532 and the wing lower surface 318 and a flap bracket pad 560 optionally mounted between the flap bracket 548 and the flap lower surface 504. The hinge bracket pads 544 may be provided in different thicknesses at the different spanwise locations of the flap hinge assemblies 530, as may the flap bracket pads 560. The different thicknesses of the hinge bracket pads 544 and flap bracket pads 560 allow the use of a common hinge bracket 532 and a common flap bracket 548 at each flap hinge assembly 530 location while maintaining a common pivot axis 558 for the multiple flap hinge assemblies 530 that support each flap 500.

Figure 27:
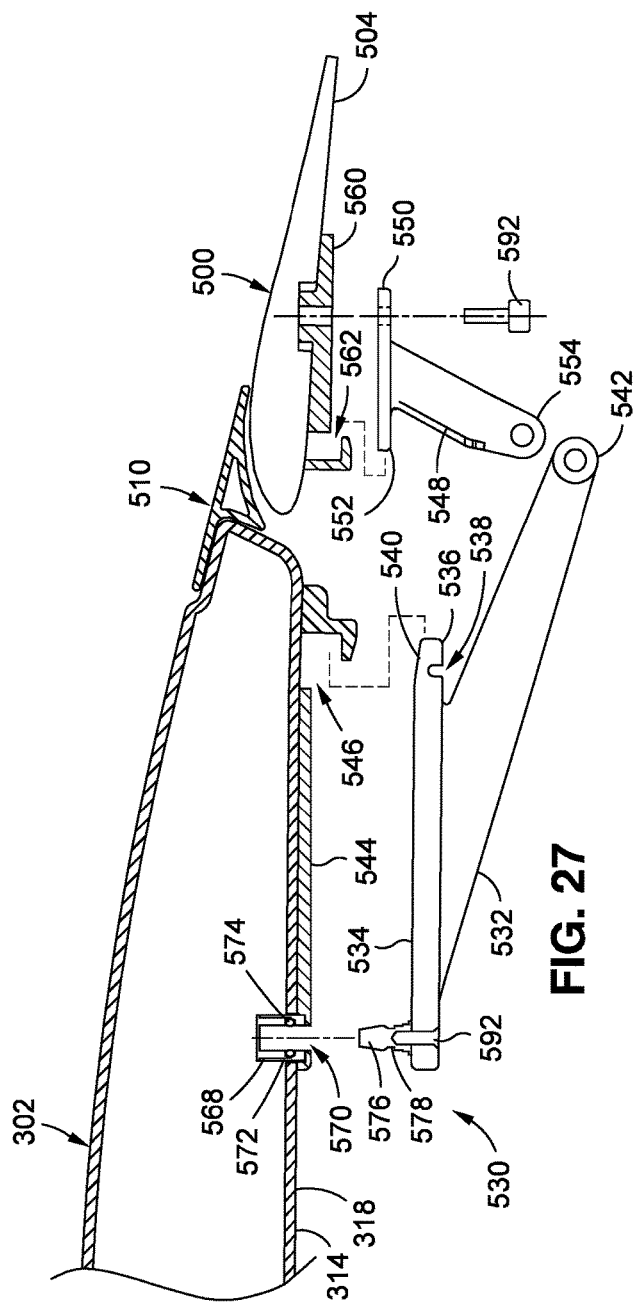
FIG. 27 is an exploded side view of the flap hinge assembly of FIG. 24.
Figure 28:
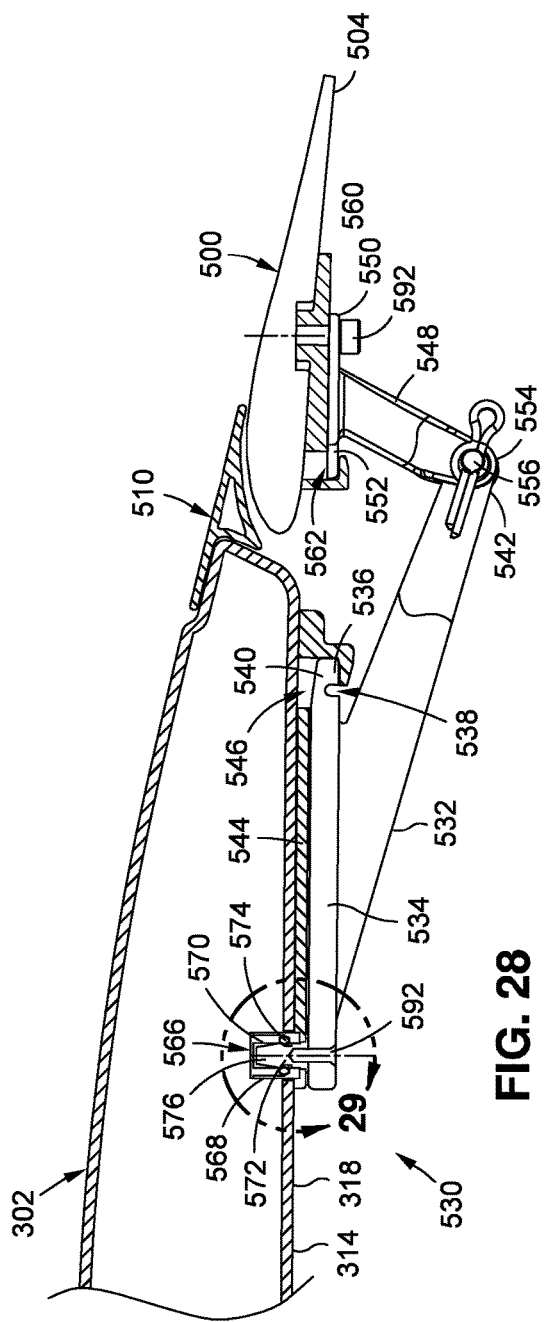
FIG. 28 is an assembled side view of the flap hinge assembly of FIG. 27.

Referring to FIGS. 24 and 27-28, each hinge bracket 532 has a hinge bracket base 534 configured to be coupled to the wing 302. When coupled to the wing 302, the hinge bracket 532 extends aftwardly and downwardly from the wing lower surface 318 and terminates at a hinge bracket pivot end 542. The flap bracket 548 has a flap bracket base 550 configured to be mounted to the flap 500. The flap bracket 548 extends forwardly and downwardly from the flap lower surface 504 and terminates at a flap bracket pivot end 554. The flap bracket pivot end 554 is coupled to the hinge bracket pivot end 542 by a pivot pin 556 which, in the example of FIG. 24, may be secured by a cotter pin or other mechanism.

Referring briefly to FIGS. 25-26, shown is an alternative embodiment for pivotably coupling the flap bracket pivot end 554 to the hinge bracket pivot end 542 using a bushing 563 installed in a hole 557 extending through the flap bracket pivot end 554 and hinge bracket pivot end 542. The bushing 563 may be internally threaded for receiving a cap screw 464 on each end of the bushing 563. A washer 565 may be installed under the head of each cap screw 464. Advantageously, the assembly shown in FIGS. 25-26 provides a relatively low profile arrangement for pivotally coupling the flap bracket pivot end 554 may be coupled to the hinge bracket pivot end 542 and which results in reduced aerodynamic drag for improved performance of the UAV 102.

In FIGS. 24 and 27-30, a releasable connector 566 (e.g., FIGS. 29-30) may couple the hinge bracket base 534 to the wing 302. As described in greater detail below, the releasable connector 566 is configured to release the hinge bracket 532 from the wing 302 when a force 522 (FIG. 21) on the flap 500 exceeds a predetermined force limit, thereby preventing structural damage to the wing 302 as may otherwise occur if the hinge bracket 532 were non-releasably attached to the wing 302. The force 522 causing release of the hinge bracket 532 from the wing 302 may be applied to the flap 500 along a downward direction and/or a forward direction. The force limit may be exceeded in any one a variety of different scenarios. For example, the force limit on the flap 500 may be exceeded during recapture of the UAV 102 when a recovery cord 606 of the recovery system (FIG. 34) wraps around the wing 302 and flap 500, resulting in a force 522 on the flap 500 in a downward and forward/or forward direction. However, the force limit may be exceeded during other scenarios such as during handling and/or transportation of the UAV 102.

In FIGS. 24 and 27-28, the hinge bracket pad 544 may be fixedly coupled to the wing 302. For example, the hinge bracket pad 544 may be adhesively bonded to the wing skin 314 and/or mechanically fastened to the wing skin 314 and/or internal wing structure (not shown). In some examples of the flap hinge assembly 530, the hinge bracket pad 544 may include a hinge bracket pad pocket 546 extending downwardly from an aft end of the hinge bracket pad 544. The hinge bracket pad pocket 546 may be open on a forward end of the hinge bracket pad 544. The hinge bracket base 534 may include a tab 536 on an aft end of the hinge bracket base 534. The tab 536 may be configured to be slidably inserted into the hinge bracket pad pocket 546 in a manner allowing the tab 536 to release from or slide out of the hinge bracket pad pocket 546. The tab 536 may be sized and configured to provide a no-slip fit (e.g., 0.001 inch) in the vertical direction while providing a clearance fit (e.g., of 0.010 inch) on one or more lateral sides of the tab 536 relative to the hinge bracket pad pocket 546. The hinge bracket pad pocket 546 may be sized to limit lateral movement of the tab 536 within the hinge bracket base 534.

As shown in FIGS. 24 and 27-30, the forward end of the hinge bracket base 534 may be coupled to the wing 302 by the above-mentioned releasable connector 566. The flap hinge assembly 530 is configured such that when the force 522 (FIG. 21) on the flap 500 exceeds a predetermined force limit, the releasable connector 566 releases the forward end of the hinge bracket base 534 from the wing lower surface 318. The releasable connector 566 includes a body 568 configured to be fixedly coupled to the wing 302, a canted coil spring 574 retained within the body 568, and a piston 576 configured to be fixedly coupled to the hinge bracket 532 and configured to be inserted into and retained within the body 568 by the canted coil spring 574. In the example shown in FIGS. 24, 27-28, and 29, a mechanical fastener 592 such as a screw may fixedly couple the hinge bracket base 534 to the piston 576. In a preferred embodiment shown in FIG. 30, the piston 576 may be extended through a counterbored hole formed in the hinge bracket 532. The head of the piston 576 may include an annular lip which may be seated on the shoulder of the counterbored hole in the hinge bracket 532. The remaining portion of the piston 576 may pass through the hole in the hinge bracket 532 and hinge bracket pad 544 and enter the body 568 for retention by the canted coil spring 574. The body 568 may be adhesively bonded and/or mechanically coupled to the wing 302 and/or wing skin 314. In this regard, the body 568 may be inserted into a hole formed in the wing lower surface 318 such that a lower end of the body 568 is flush with or slightly protrudes from the wing lower surface 318. The portion of the body 568 protruding below the wing lower surface 318 may be received within an opening formed in an underside of the forward end of the hinge bracket pad 544.

Figure 30:
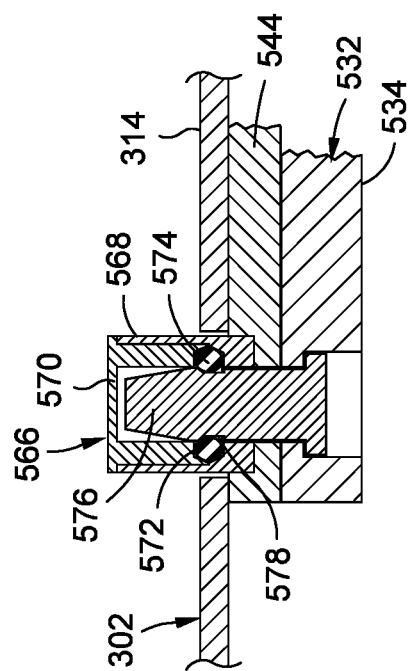
FIG. 30 is an example of the piston directly coupling the forward end of the hinge bracket to the wing lower surface.
Figure 29:
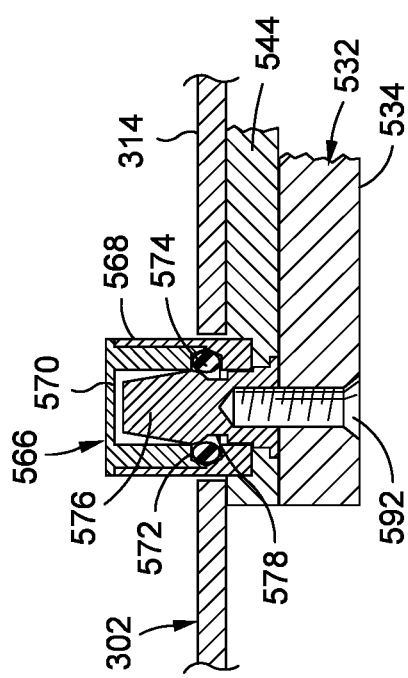
FIG. 29 is a magnified view of a forward end of the flap hinge assembly taken along section circle 29 of FIG. 28 and illustrating a mechanical fastener coupling a piston of a releasable connector to a forward end of the hinge bracket, and further illustrating the piston retained within a body of the releasable connector via a canted coil spring.

As shown in FIGS. 29-30, the body 568 includes a body bore 570 having an annular bore groove 572. The canted coil spring 574 is formed in a ring shape and is sized to be retained within the bore groove 572. The piston 576 has an annular piston groove 578 configured to receive the canted coil spring 574 when the piston 576 is inserted into the body bore 570 and the annular piston groove 578 is axially at the same position as the annular bore groove 572. The canted coil spring 574 is sized and configured to exert a radially inward (e.g., squeezing) force on the piston groove 578 and thereby resist axial motion of the piston 576 out of the body bore 570. In this regard, the releasable connector 566 is configured to retain the piston 576 within the body 568 up until the point at which the force 522 (FIG. 21) on the flap 500 exceeds the predetermined force limit. Upon reaching the predetermined force limit, the canted coil spring 574 expands radially outwardly from the annular piston groove 578 under the influence of the piston 576 being urged axially out of the body bore 570 under the force 522 on the flap 500, resulting in the hinge bracket 532 at least partially releasing or completely separating from the wing 302.

Referring to FIGS. 27-28, the underside of the tab 536 may be provided with a ramped surface 540 to allow upward pivoting of the hinge bracket base 534 when the tab 536 is inserted into the hinge bracket pad pocket 546 during mounting of the hinge bracket 532 to the wing 302. In addition, the ramped surface 540 on the underside of the tab 536 allows for downward pivoting of the hinge bracket base 534 when the piston 576 is urged axially out of the body 568 of the releasable connector 566 under the force 522 on the flap 500. Once the piston 576 is out of the body bore 570, the tab 536 is able to slide out of the hinge bracket pad pocket 546 allowing for full separation of the hinge bracket 532 from the wing 302. In some examples, the hinge bracket base 534 may include a transverse groove 538 partially dividing the tab 536 on the aft end of the hinge bracket base 534 from a forward portion of the hinge bracket base 534. When the force 522 on the flap 500 exceeds the force limit, the hinge bracket base 534 may fracture along the relatively thin cross-section of the hinge bracket base 534 at the location of the transverse groove 538, and resulting in the tab 536 remaining in the hinge bracket pad pocket 546 while the forward portion of the hinge bracket base 534 together with the hinge bracket 532 separate from the wing 302. The fracture of the hinge bracket base 534 along the transverse groove 538 may occur when the releasable connector 566 releases the forward end of the hinge bracket base 534 from the wing lower surface 318.

Referring still to FIGS. 27-28, the flap hinge assembly 530 may include a flap bracket pad 560 which may be fixedly coupled to the flap lower surface 504 such as by adhesive bonding and/or mechanical fastening. The flap bracket pad 560 may include a flap bracket pad pocket 562 extending downwardly from a forward end of the flap bracket pad 560. The flap bracket pad pocket 562 may be open on an aft end of the flap bracket pad pocket 562. The flap bracket base 550 may be provided with a tongue 552 on a forward end of the flap bracket base 550. The tongue 552 may be sized and configured to be slidably inserted into the flap bracket pad pocket 562. For example, the tongue 552 may be sized to provide a clearance fit (e.g., maximum 0.030 inch gap) with the sides of the flap bracket pad pocket 562. In this regard, flap bracket pad pocket 562 may be sized and configured to limit lateral movement of the tongue 552 (the forward end) of the flap bracket base 550. The flap bracket base 550 may be placed in direct physical contact with the flap bracket pad 560. The aft end of the flap bracket base 550 may be secured to the flap 500 by a relatively small diameter mechanical fastener 592 that extends through the flap bracket base 550 and flap bracket pad 560 and into a threaded receptacle (not shown) in the flap 500.

The flap hinge assembly 530 may be configured such that when the force 522 on the flap 500 is exceeded, the flap bracket 548 may fracture preventing damage to other more expensive components (e.g., the flap actuator 580) of the flap 500 system. The flap hinge assembly 530 may be configured such that the partial or complete release of one or more of the flap brackets 548 from the flap 500 may occur with or without the partial or complete release of one or more of the hinge brackets 532 from the wing 302.

Referring to FIG. 31, shown is an example of a flap actuator 580 configured to actuate the flap 500 within the above-mentioned flap travel limits. The flap actuator 580 is fixedly mounted to the wing 302. For example, the flap actuator 580 may be configured as a servo that may be mounted to internal structure (not shown) of the wing 302 or wing skin 314. The flap 500 may include a flap bellcrank 582 extending downwardly from the flap 500. The flap actuator 580 may be operably coupled to the flap bellcrank 582 by an actuator rod 584. Opposing ends of the actuator rod 584 may include rod ends 588 respectively coupled to the flap actuator 580 and flap bellcrank 582. In some examples, the actuator rod 584 may be configured to fail upon the release or separation of one or more of the hinge brackets 532 and/or flap brackets 548 respectively the from the wing 302 or flap 500.

FIG. 32 illustrates an embodiment of the actuator rod 584 having integral rod ends 588 and an annular notch 586 located at an approximate midpoint of the actuator rod 584. The annular notch 586 represents a locally reduced cross-sectional area of the actuator rod 584, and is designed to fail in bending when the flap 500 is dislodged as a result of at least partial release of at least one of the hinge brackets 532 and/or flap brackets 548 respectively from the wing 302 or flap 500.

FIG. 33 illustrates a further embodiment of the actuator rod 584 configured as a thin-walled hollow tube 590 configured to threadably receive separate rod ends 588 on each end of the hollow tube 590. The hollow tube is configured to fail in bending when the flap 500 is dislodged as a result of at least partial release of at least one of the hinge brackets 532 and/or flap brackets 548 respectively from the wing 302 or flap 500. For example, the hollow tube 590 actuator rod 584 may be designed to fail in bending at a location other than adjacent to the rod ends 588.

Figure 34:
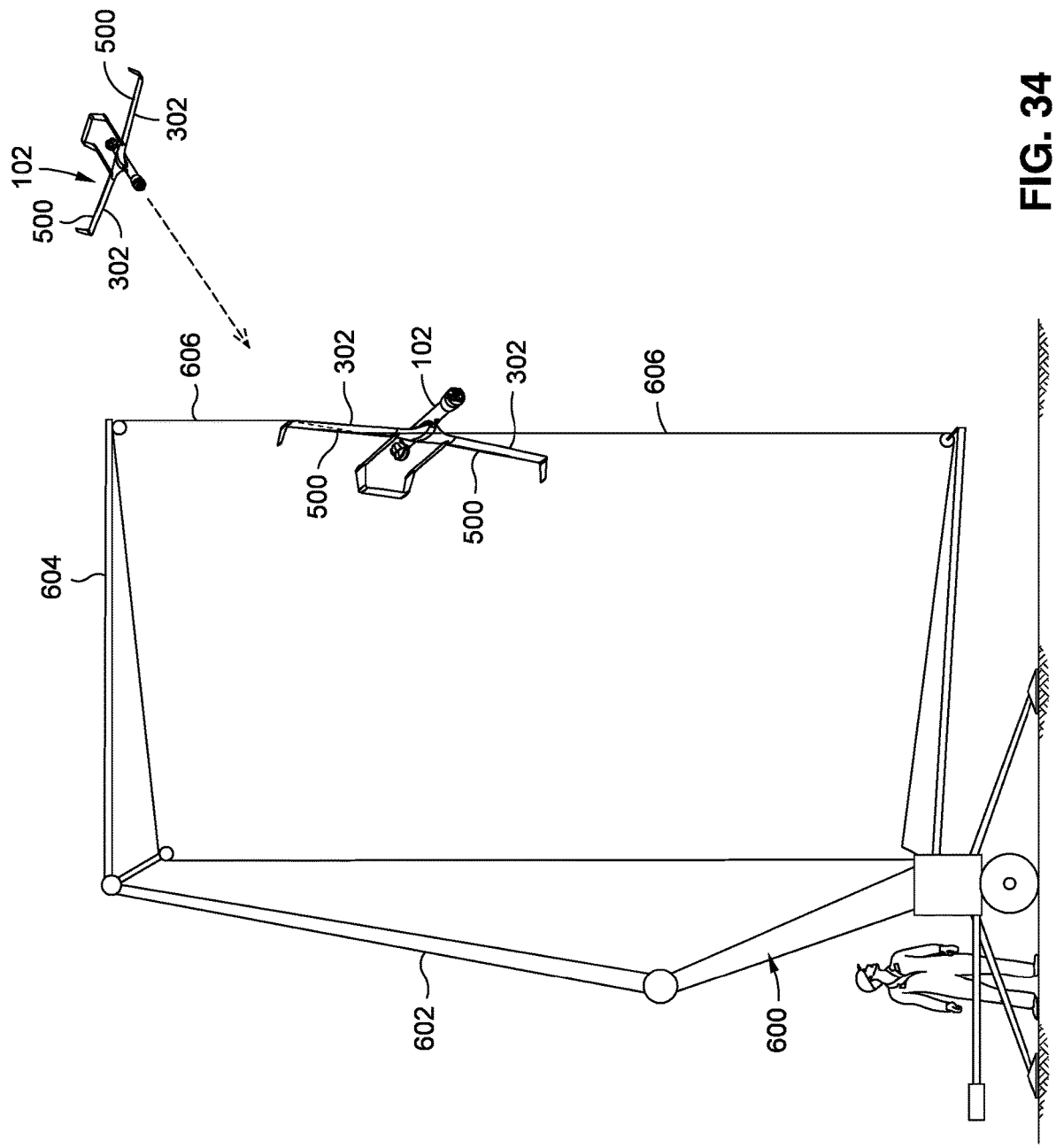
FIG. 34 is a side view of an example of an aircraft recovery system for recovering the UAV using a recovery cord configured to be engaged by a line capture mechanism (not shown) mounted on each of opposing wing tips of the UAV.

FIG. 34 shows an example of an aircraft recovery system 600 for recovering the UAV 102. The recovery system 600 may include a mast 602 supporting a boom 604 from which the recovery cord 606 may be suspended by a system of pulleys. The UAV 102 may include a line capture mechanism (not shown) mounted on each of the opposing wing 302 tips. As the UAV 102 flies into the recovery cord 606, one of the line capture mechanisms latches onto the recovery cord 606 which stops the UAV 102. During the capture of the UAV 102, the recovery cord 606 may wrap around the wing 302 and flap 500 resulting in the application of a force 522 (FIG. 21) on the flap 500. As described above, the flap hinge assemblies 530 are configured to release or separate from the wing 302 when the force 522 on the flap 500 exceeds a predetermined force limit. Release of one or more of the flap hinge assemblies 530 may prevent damage to the wing 302 during the capture of the UAV 102.

FIG. 35 is a flowchart of operations included in a method 650 of operating an aircraft 100 such as a UAV 102. Step 652 of the method 650 includes moving the aircraft 100 through the air. The method includes sealing the slot 520 when the flap 500 is in the neutral position 516 (FIG. 21) by using a cove strip 510. As described above, the cove strip 510 is fixedly secured to the wing aft portion 322.

Step 654 of the method 650 includes pivoting the flap 500 from the neutral position 516 in which air is prevented from flowing between the wing aft portion 322 and the flap leading edge 506, to a downwardly deflected position 518. As mentioned above, when the flap 500 of each wing 302 is in a downwardly deflected position 518 of approximately 30 degrees, the wing assembly 300 has a maximum lift coefficient $CL_{max}$ that is at least 30% greater than the maximum lift coefficient of the wing assembly 300 without flaps 500.

Step 656 of the method 650 includes opening a slot 520 between the flap leading edge 506 of each wing 302 and the wing aft portion 322 as the flap 500 is pivoted into the downwardly deflected position 518. As shown in FIG. 22, the cove strip lower surface 514 is contoured such that during flight when the flap 500 is in the downwardly deflected position 518, at least a portion of the air flowing along the wing lower surface 318 flows upwardly through the slot 520 and is redirected aftwardly along the flap upper surface 502 by the cove lower surface.

Step 658 of the method 650 includes reducing flow separation over the flap 500 as a result of the air flowing upwardly through the slot 520 and aftwardly along the flap upper surface 502, resulting in an increase in maximum lift coefficient $CL_{max}$ and a reduction in stall speed of the UAV 102. As mentioned above, the flaps 500 working in conjunction with the relatively large wing area result in the ability to recover the UAV 102 at a relatively slow airspeed which reduces (e.g., by approximately 25%) the total amount of energy that the recovery system (FIG. 34) must absorb when capturing the UAV 102 relative to the total capture energy required to recover the same UAV without flaps. The ability to reduce the total recapture energy avoids the need to modify an existing recovery system that may be configured to recover lighter weight and/or slower flying UAVs.

As mentioned above, each flap 500 may be supported by a plurality of flap hinge assemblies 530 coupling the flap 500 to the wing lower surface 318 using a releasable connector 566 in at least one of the flap hinge assemblies 530. The method 650 may include releasing, at the releasable connector 566, at least one of the flap hinge assemblies 530 from the wing 302 when a force 522 (FIG. 21) on the flap 500 exceeds a force limit. In such an arrangement, the method may include separating the flap 500 from the wing 302 during release of one or more flap hinge assemblies 530 from the wing 302. As mentioned above, the releasable connector 566 may prevent structural damage to the wing 302 at the location where the hinge bracket 532 is attached to the wing 302. The step of releasing at least one of the flap hinge assemblies 530 from the wing 302 may include axially moving a piston 576 (FIGS. 29-30) of the releasable connector 566 out of a body bore 570 formed in a body 568 (FIGS. 29-30) of the releasable connector 566.

As shown in FIGS. 29-30, the piston 576 is coupled to the hinge bracket base 534, and the body 568 is coupled to the wing 302. As described above, the piston 576 has an annular piston groove 578 configured to receive the ring-shaped canted coil spring 574 that is retained within an annular bore groove 572 in the body 568. When the piston 576 is inserted into the body bore 570, the canted coil spring 574 exerts a radially inward force on the piston groove 578 and thereby resists axial movement of the piston 576 out of the body bore 570. However, when the force 522 on the flap 500 exceeds the predetermined force limit, the canted coil spring 574 radially expands as the canted coil spring 574 axially out of the piston groove 578 as the piston 576 is urged out of the body bore 570, allowing the piston 576 to completely move out of the body bore 570, and resulting in the hinge bracket 532 releasing from the wing 302. The release of the hinge bracket 532 of the flap hinge assembly 530 from the wing 302 may include sliding the tab 536 of the hinge bracket base 534 out of the hinge bracket pad pocket 546 which extends downwardly from the aft end of hinge bracket pad 544 as shown in FIGS. 27-28. However, in some examples, the release of the hinge bracket 532 from the wing 302 may include at least partially fracturing a transverse groove 538 (FIGS. 27-28) formed in the hinge bracket base 534. As described above, the transverse groove 538 partially divides the tab 536 on the aft end of the hinge bracket base 534 from a forward portion of the hinge bracket base 534.

The method 650 may optionally include sliding a tongue 552 (FIGS. 25-26) of the flap bracket 548 out of a flap bracket pad pocket 562 formed in a flap bracket pad 560. As described above, the flap bracket pad pocket 562 extends downwardly from the forward end of the flap bracket pad 560. The aft end of the flap bracket 548 may be secured to the flap 500 by means of a mechanical fastener 592 as shown in FIGS. 27-28. The flap bracket 548 may be sized relatively small allowing the flap bracket 548 to fracture when the force limit on the flap 500 is exceeded resulting in the release of the flap bracket 548 from the flap 500.

The method 650 may include actuating the flap 500 using a flap actuator 580 (FIG. 20) fixedly mounted to the wing 302 and operably coupled by an actuator rod 584 to a flap bellcrank 582 extending downwardly from the flap 500. Upon the at least partial detachment of at least one of the flap hinge assemblies 530 from the wing 302, the method 650 may include bending the actuator rod 584 as the flap 500 moves away from the wing 302 due to at least partial separation of at least one of the hinge brackets 532 and/or at least one of the flap brackets 548 respectively from the wing 302 or flap 500. As described above, bending of the actuator rod 584 may prevent damage to the flap actuator 580, the wing 302, or the flap 500.

Referring to FIG. 36, shown is a side view of a vertical tail 226 extending upwardly from the tail boom 202 of the UAV 102 and illustrating an example of a lightweight, wideband, omnidirectional, monopole antenna 700 mounted to the vertical tail 226. A coaxial cable 760 extending through the tail boom 202 is coupled to an edge of the antenna 700. The coaxial cable 760 may transmit line signals between the antenna 700 and components such as a diplexer, a radio, and/or other components located in the wing center module 328, the fuselage 104, the vertical tail(s) 226, and/or any other location in the UAV 102. The antenna 700 has a relatively flat or thin profile (e.g., FIG. 39) which facilitates mounting the antenna 700 inside any one or more of a variety of structures. For example, although shown as mounted in a vertical tail 226, the antenna 700 may alternatively or additionally be mounted in other locations on a UAV 102 such as in the winglets (not shown) and/or within a radome (not shown). Even further, the presently-disclosed antenna 700 is not limited for mounting in a UAV 102, but may be mounted in any one of a variety of vehicle types including different types of aircraft 100.

Advantageously, the omnidirectional antenna 700 is capable of transmitting and receiving radio signals regardless of the orientation of the vehicle. The antenna 700 has an omnidirectional pattern providing stable gain performance over a wide range of vehicle attitudes and orientations and enabling the mounting of the antenna 700 in a variety of mounting positions and orientations. In addition, the antenna 700 is capable of transmitting and receiving radio signals over a wide range of frequencies including S-band and L-band, thereby allowing the antenna 700 to replace a plurality of conventional narrowband antennas. In this regard, the antenna 700 may transmit and receive radio signals containing command data and control data for respectively commanding and controlling the UAV 102. Additionally, the antenna 700 may transmit and receive radio signals including imaging data generated by an imaging system 108 that may be mounted to the UAV 102. Such an imaging system 108 may include a turret-mounted infrared sensor, electro-optical sensor, and/or camera. Advantageously, the construction of the antenna 700 is environmentally robust and has high corrosion resistance and high resistance to damage from shock, vibration, and other environmental factors. In addition, the antenna may be easily and cost-effectively produced using printed circuit board fabrication and assembly processes.

Figures 38, 39, 40:
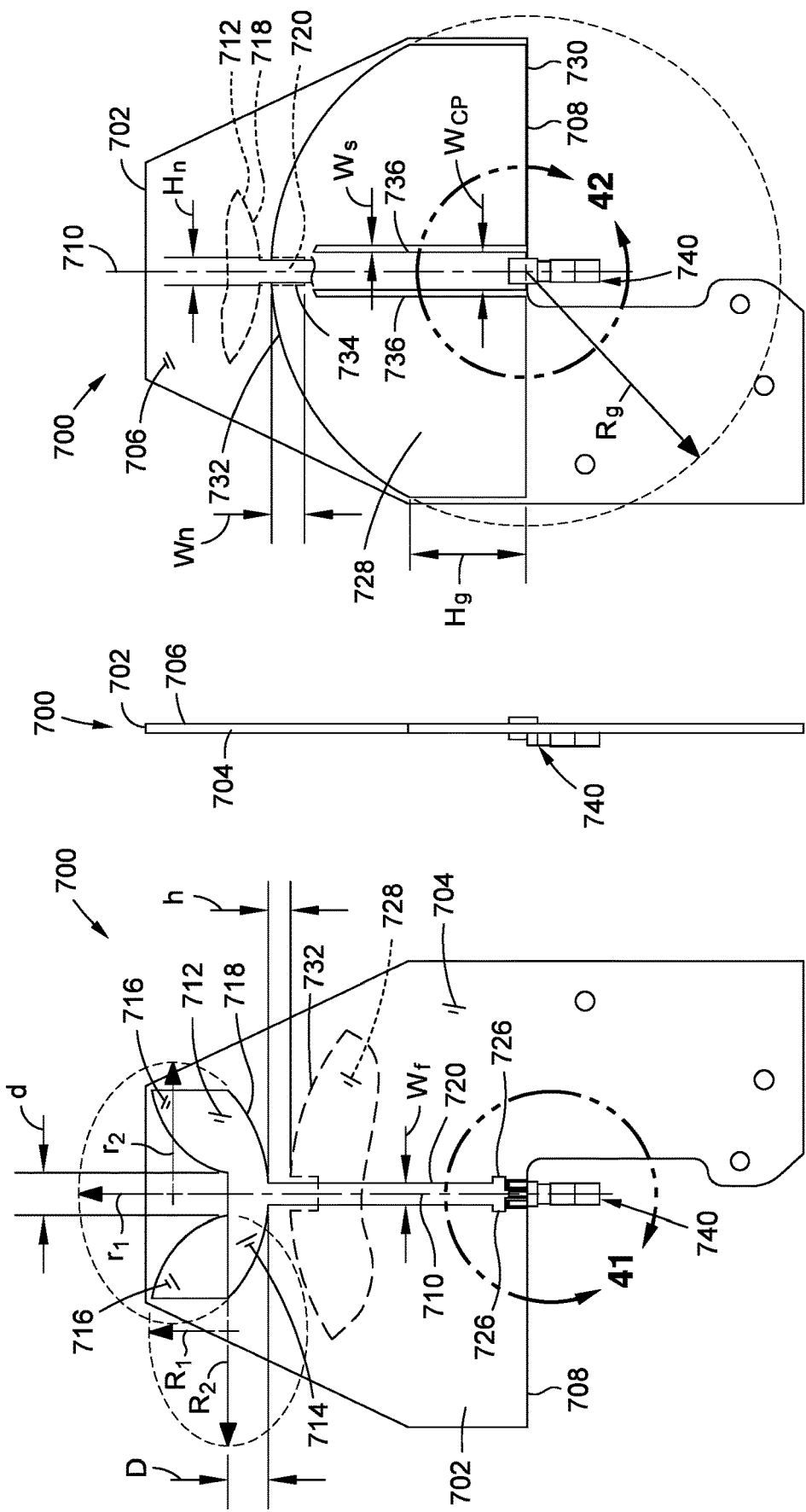
FIG. 38 is a side view of a first surface of the antenna of FIG. 37 having a radiating element for transmitting and receiving radio signals.
FIG. 39 is an end view of the antenna of FIG. 38.
FIG. 40 is a side view of the second surface of the antenna of FIG. 37 having a ground plane for reflecting radio signals transmitted and received by the radiating element located on the first surface of the antenna.
Figure 42:
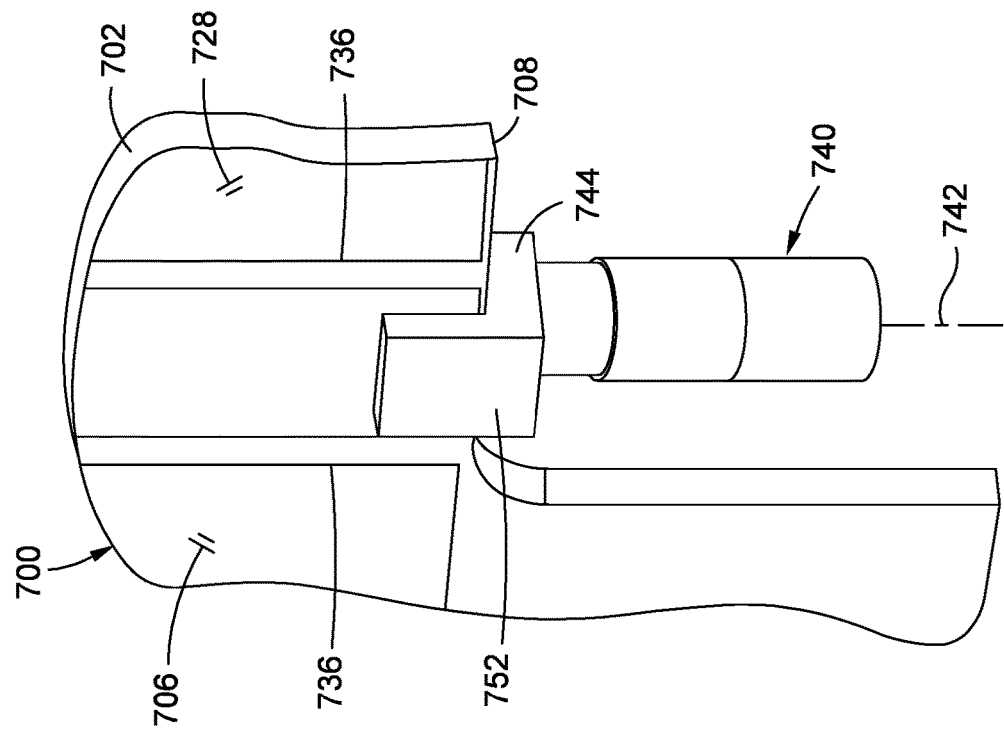
FIG. 42 is a perspective view of the antenna showing the edge-mounted connector electrically coupled to the ground plane on the second surface of the antenna.

FIG. 37 is a perspective view of the antenna 700 of FIG. 36. The antenna 700 includes a dielectric substrate 702 having a first surface 704, an opposing second surface 706, and a substrate lower edge 708. The dielectric substrate 702 may have one or more antenna-mounting holes for mounting the antenna 700 to a structure of the UAV 102. A radiating element 712 is formed on the first surface 704 and is configured to radiate and receive radio signals. The radiating element 712 has a microstrip feed element 720 extending from a radiating element lower edge 718 (FIG. 38) to the substrate lower edge 708 (FIG. 38). A ground plane 728 (FIG. 40) is formed on the second surface 706 and is configured to reflect the radio signals transmitted and received by the radiating element 712. An edge-mounted connector 740 is mounted to the antenna 700 at the substrate lower edge 708 and is configured to electrically connect the coaxial cable 760 (FIG. 36) to the ground plane 728 and the microstrip feed element 720, as described in greater detail below.

FIG. 38 shows the first surface 704 of the antenna 700 and illustrates an example of the radiating element 712. The radiating element 712 defines an antenna axis 710 oriented parallel to the first surface 704. The microstrip feed element 720 is oriented parallel to the antenna axis 710 and extends from the radiating element lower edge 718 to the substrate lower edge 708. The radiating element 712 and the microstrip feed element 720 are both symmetrical about the antenna axis 710 as is the ground plane 728. The radiating element 712 may be formed of a thin layer of metallic material and is configured for transmitting and receiving radio signals at least in the L-band and S-band.

The geometry of the radiating element 712 is made up of a pair of one-quarter ellipse portions 716 and a base portion 714. The pair of one-quarter ellipse portions 716 are symmetrically formed on opposite sides of the antenna axis 710 and extend upwardly from and are interconnected by the base portion 714. The base portion 714 is defined in part by an elliptically-shaped radiating element lower edge 718. The microstrip feed element 720 extends downwardly from the radiating element lower edge 718 to the substrate lower edge 708, as mentioned above. In the present disclosure, the length, width dimensions and relative positions of the antenna 700 components are described relative to the antenna axis 710, wherein the length and width dimensions are respectively parallel to and perpendicular to the antenna axis 710, and wherein the radiating element 712 is located above the ground plane 728 when the antenna 700 is viewed along a direction normal to the first surface 704 or second surface 706.

Referring still to FIG. 38, the pair of one-quarter ellipse portions 716 of the radiating element 712 may be spaced apart by a distance d of approximately 5.0-9.0 mm and, more preferably, between 6.0-7.5 mm (e.g., approximately 6.86 mm). Each one of the one-quarter ellipse portions 716 may have a minor radius R1 of approximately 12-18 mm (e.g., approximately 14.7 mm) and a major radius R2 of approximately 13-21 mm (e.g., approximately 17.0 mm). The base portion 714 may have a base portion height D of approximately 5.0-8.0 mm (e.g., approximately 6.4 mm). The elliptically-shaped radiating element lower edge 718 may have a minor radius r1 of approximately 15-26 mm (e.g., approximately 19.5 mm), and a major radius r2 of approximately 18-28 mm (e.g., approximately 22.6 mm). The microstrip feed element 720 may have a width Wf of approximately 2.5-4.5 mm and, more preferably, between 3.0-4.0 mm (e.g., 3.55 mm).

Referring to FIG. 39, shown is an edge view of the antenna 700 illustrating the dielectric substrate 702 having a generally planar shape defined by the first surface 704 and the second surface 706 opposing the first surface 704. The dielectric substrate 702 is formed of an insulating dielectric material such as printed circuit board material such as fiberglass or other non-electrically-conductive material. Preferably, the dielectric substrate 702 is formed of a hydrocarbon ceramic laminate material known commercially as "Rogers RO4350B" having a dielectric constant of 3.38. The dielectric substrate 702 preferably has a relatively small thickness. For example, the dielectric substrate 702 may have a thickness of less than 0.20 inch and, more preferably, a thickness of less than 0.10 inch. For example, the dielectric substrate 702 is provided in a thickness of 0.062 inch (1.575 mm) for use with the above-mentioned dimensions of the antenna 700 components.

Referring to FIG. 40, shown is the ground plane 728 formed on the second surface 706. In the example shown, the ground plane 728 has a ground plane lower edge 730 that is coincident with the substrate lower edge 708. The ground plane 728 has a ground plane upper edge 732 having a semicircular shape that is centered on the antenna axis 710. The ground plane 728 has truncated opposing vertical sides that are parallel to the antenna axis 710. The ground plane 728 may be positioned relative to the radiating element 712 such that when the antenna 700 is viewed along a direction perpendicular (e.g., normal) to the second surface 706, the ground plane upper edge 732 is located at a feed gap h below the radiating element lower edge 718. The feed gap h between the ground plane upper edge 732 and the radiating element lower edge 718 may be approximately 1.0-3.0 mm (e.g., approximately 2.0 mm). The semicircular ground plane upper edge 732 may have a ground plane radius Rg of approximately 35-47 mm (e.g., approximately 41 mm), and a ground plane height Hg of approximately 15-25 mm (e.g., approximately 18.7 mm). The ground plane upper edge 732 may include a rectangular notch 734 centered on the antenna axis 710. The notch 734 may be wider than the width of the microstrip feed element 720. For example, the notch 734 may have a notch width Wn of approximately 4-6 mm (e.g., approximately 5.3 mm). The notch 734 may have a notch height Hn of approximately 2.5-4.5 mm (e.g., approximately 3.3 mm).

In FIG. 40, the ground plane 728 includes a pair of ground plane slots 736 respectively located on opposite sides of the antenna axis 710. The ground plane slots 736 may extend upwardly from the ground plane lower edge 730 to a location just below the ground plane upper edge 732. The inner edge of each one of the ground plane slots 736 may be located outside of a laterally outer edge of the microstrip feed element 720 when the antenna 700 is view along a direction perpendicular to a surface (e.g., the first surface 704) of the dielectric substrate 702. The inner edges of the ground plane slots 736 are separated by a central portion 735 of the ground plane 728 having a central portion width Wcp in the range of approximately 5.0-7.0 mm and, more preferably, approximately 6.0 mm. Each one of the ground plane slots 736 may have a slot width Ws in the range of between 0.7-1.5 mm and, more preferably, between 0.9-1.2 mm (e.g., approximately 1.1 mm). The upper end of each one of the ground plane slots 736 may terminate below the bottom edge of the notch 734. For example, the upper end of each one of the ground plane slots 736 may terminate at a distance of approximately 0.5-3.0 mm and, more preferably, approximately 1.0 mm below the bottom edge of the notch 734. Advantageously, the ground plane slots 736 may attenuate undesirable leakage currents or parasitic currents that may flow on the outside of the coaxial cable 760 and causing distortion of the omnidirectional radiation pattern of the antenna 700. In this regard, the ground plane slots 736 may minimize the influence of the length and orientation of the coaxial cable 760. The attenuation of the leakage currents may improve the radiation pattern of the radio signals across a wide range of frequencies.

Figure 41:
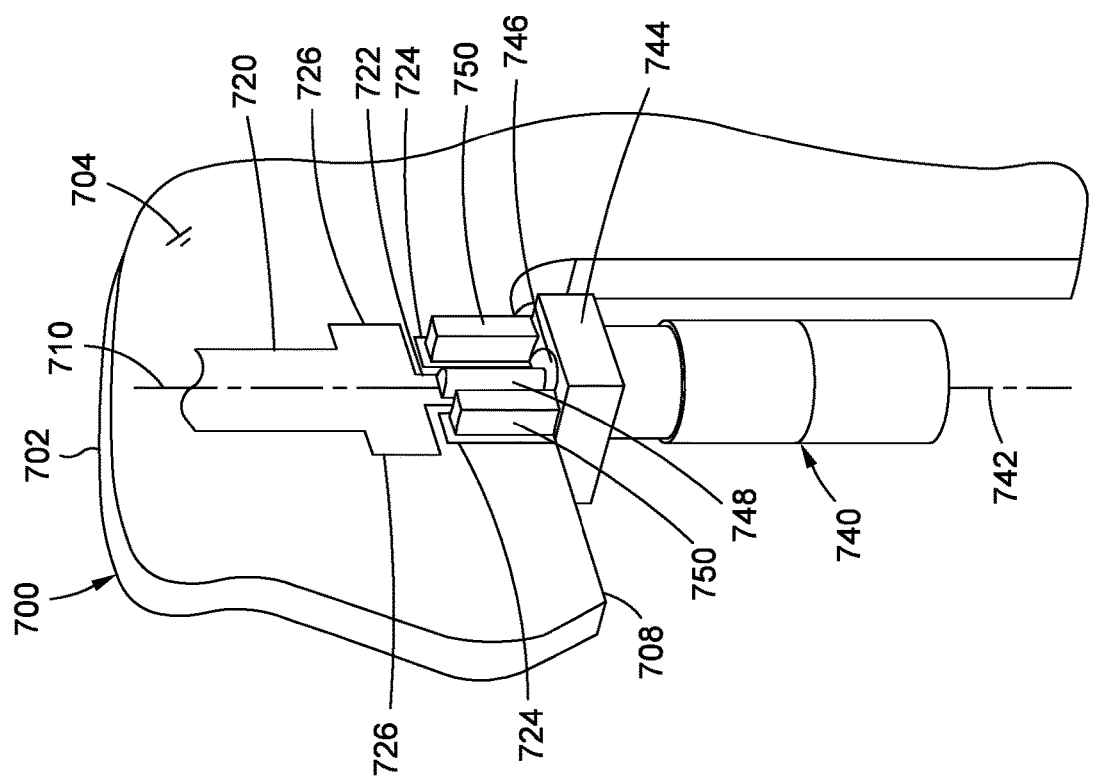
FIG. 41 is a perspective view of the antenna showing an edge-mounted connector for electrically coupling a coaxial cable to a microstrip feed element extending downwardly from the radiating element on the first surface of the antenna.

Referring to FIG. 41, shown is an example of an edge-mounted connector 740 for coupling the coaxial cable 760 (FIG. 38) to the antenna 700. The coaxial cable 760 has a center conductor (not shown) formed of electrically conductive material such as metallic material (e.g., copper or copper-clad steel). The center conductor is surrounded by a dielectric insulator (not shown—e.g., polyethylene, polytetrafluoroethylene—PTFE, etc.). The dielectric insulator is surrounded by an outer conductor (not shown—e.g., wire braid, copper tubing, etc.) which is surrounded by an outer insulator or jacket (not shown—e.g., polyvinylchloride—PVC). As mentioned above, the coaxial cable 760 functions as a signal transmission line for transmitting line signals between the antenna 700 and a transmitting and/or receiving component mounted in the wing center module 328, the fuselage 104, or in any other location on the UAV 102.

The edge-mounted connector 740 may be secured to the substrate lower edge 708 such as by adhesive (e.g., epoxy) bonding. When bonded to the substrate lower edge 708, the connector axis 742 of the edge-mounted connector 740 is oriented parallel to the antenna axis 710. The lower end of the edge-mounted connector 740 is configured to be electrically coupled (e.g., via screw-type threadable connection) to the center conductor 762 and the outer conductor 766 of the coaxial cable 760. The upper end of the edge-mounted connector 740 is fixedly electrically connected (e.g., via soldering) to the microstrip feed element 720 and the ground plane 728 as described below. The edge-mounted connector 740 may be an SSMC-type connector, or a sub-miniature version A (SMA) connector.

Referring to FIGS. 41-44, the edge-mounted connector 740 includes a base plate 744 oriented perpendicular to the first surface 704 and second surface 706 and configured to be positioned adjacent to and/or butted up against the substrate lower edge 708. In addition, the edge-mounted connector 740 includes a center pin 748 extending upwardly from an insulating plug 746 surrounded by the base plate 744 and oriented parallel to the antenna axis 710. The center pin 748 is electrically insulated from the base plate 744 by the insulating plug 746. The center pin 748 is electrically connected (e.g., soldered) to a pin pad 722 formed on the first surface 704 and extending downwardly from the microstrip feed element 720. The pin pad 722 may be located between a pair of prong pads 724 formed on the first surface 704 on opposite sides of the pin pad 722. The prong pads 724 are electrically isolated from the pin pad 722. The edge-mounted connector 740 may include a plurality of mounting prongs 750 extending upwardly (e.g., oriented perpendicular to) from the base plate 744. The mounting prongs 750 may be integral with the base plate 744 and may be oriented parallel to the center pin 748. In the example shown, the edge-mounted connector 740 includes a pair of mounting prongs 750 configured to be electrically coupled (e.g., soldered to) to the pair of prong pads 724 on the first surface 704.

As shown in FIG. 43, the edge-mounted connector 740 may include a mounting plate 752 extending upwardly from and oriented perpendicular to the base plate 744. The mounting plate 752 may be integral with the base plate 744 and may be oriented parallel to the center pin 748. The mounting plate 752 may be electrically coupled (e.g., soldered) to the portion of the ground plane 728 located between the ground plane slots 736 (FIG. 42) on the second surface 706. The center pin 748, the mounting prongs 750, and the mounting plate 752 may terminate at approximately the same height (e.g., within 0.5 mm of each other). On the first surface 704, the pin pad 722 may transfer line signals between the center pin 748 of the edge-mounted connector 740 and the microstrip feed element 720.

Referring to FIG. 41-44, the prong pads 724 may each have a width (measured perpendicular to the lengthwise direction of the microstrip feed element 720) in the range of between 0.7-1.5 mm and, more preferably, between 1.0-1.5 mm (e.g., approximately 1.2 mm) to be compatible with the size of the mounting prongs 750. The prong pads 724 may be spaced complementary to the spacing between the mounting prongs 750. Each prong pad 724 has a height extending from the substrate lower edge 708 upwardly at least to a height of the mounting prongs 750. The prong pads 724 are formed such that a gap exists between an upper edge of each prong pad 724 and a lower portion of the microstrip feed element 720. The height of each prong pad 724 may be in the range of between 2.0-4.0 mm and, more preferably, between 2.5-3.5 mm (e.g., approximately 3.0 mm). The pin pad 722 may have a width that is at least as wide as the center pin 748 of the edge-mounted connector 740. In an embodiment, the pin pad 722 may have a width in the range of between 0.7-1.5 mm and, more preferably, between 1.0-1.5 mm (e.g., approximately 1.3 mm). The pin pad 722 may have a height extending from the substrate lower edge 708 up to at least the height of the center pin 748. The pin pad 722 is electrically connected to or is integral with the lower portion of the microstrip feed element 720. The height of the pin pad 722 may be in the range of between 2.5-4.0 mm and, more preferably, between 2.9-3.5 mm (e.g., approximately 3.2 mm).

Referring to FIG. 44, the microstrip feed element 720 includes a pair of stubs 726 protruding laterally outwardly respectively from opposite sides of the microstrip feed element 720. The stubs 726 are formed on the first surface 704 as part of the microstrip feed element 720. The stubs 726 are located immediately above and aligned with and electrically isolated from the mounting prongs 750 when the antenna 700 is viewed along a direction perpendicular to the second surface 706. The stubs 726 are each rectangular in shape and have a height of 1.5-2.5 mm and a width of 0.5-1.5 mm. More preferably, the stubs 726 each have a height of approximately 2.0 mm and a width of approximately 1.0 mm. The lower edge of each stub 726 may be located immediately above the base plate 744. More specifically, the lower edge of each stub 726 may be located less than 1.0 mm and, more preferably, less than 0.5 mm above but non-contacting contacting a respective prong pad 724. Advantageously, the stubs 726 improve wideband impedance matching for the antenna 700.

In FIGS. 37-44, the radiating element 712, the microstrip feed element 720 (including the center pin 748 and stubs 726), the prong pads 724, and the ground plane 728 may be formed of an electrically-conductive material such as a metal layer (e.g., copper cladding or foil) formed on the first surface 704 and the second surface 706. Such electrically-conductive material may be etched, printed, deposited, bonded, or otherwise formed on the first surface 704 and second surface 706 as appropriate.

Figure 45:
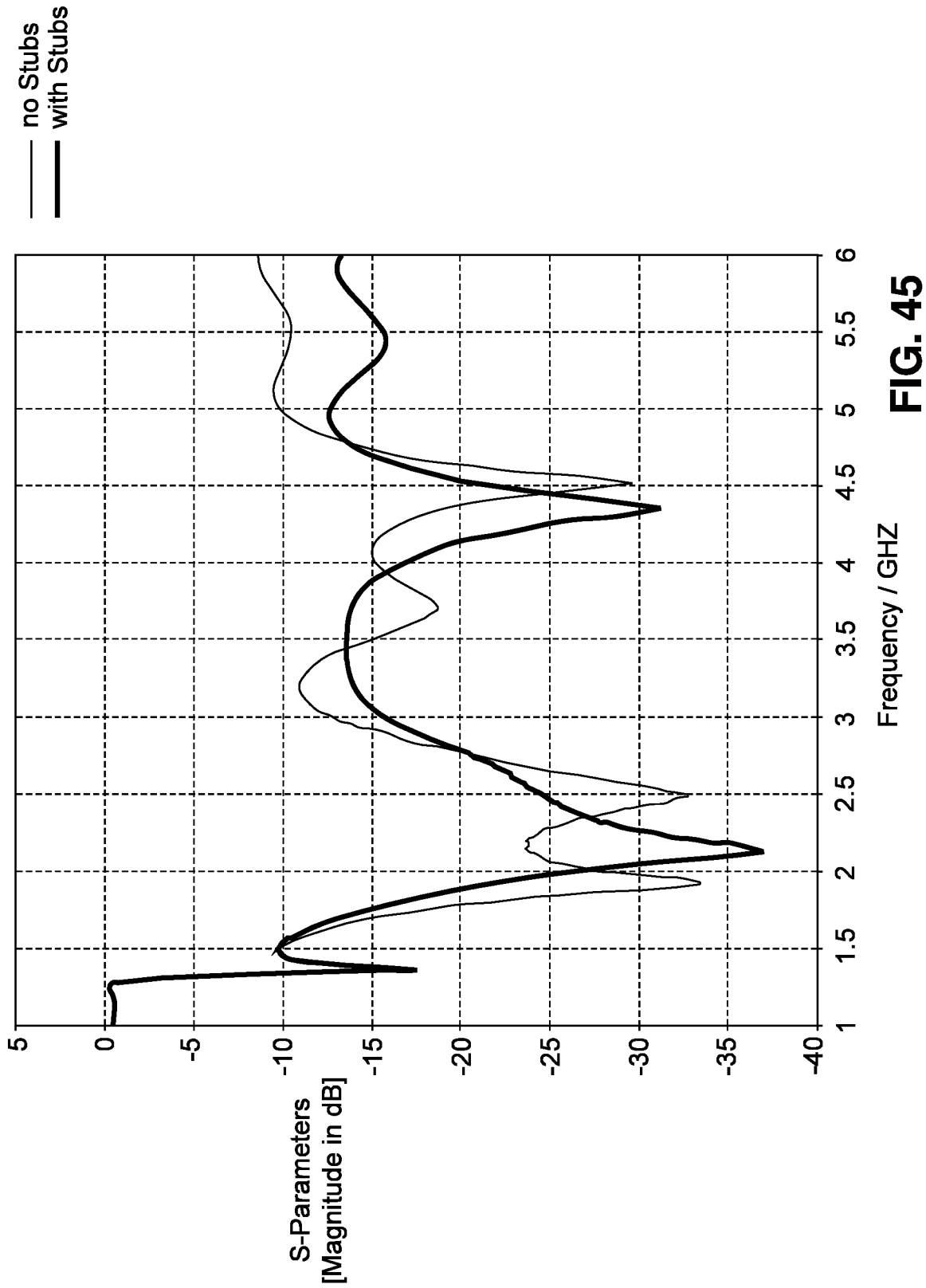
FIG. 45 is a graph of return loss represented as S-parameters vs. frequency for an antenna with and without stubs extending laterally outwardly from the microstrip feed element shown in FIGS. 43-44.

Referring to FIG. 45, shown is a graph of return loss expressed as S-parameters vs. frequency for the presently-disclosed antenna 700 with stubs 726, and for the same antenna 700 without stubs 726. As mentioned above, the antenna 700 is configured to radiate and receive radio signals in the range of approximately 1.3-6 GHz. More preferably, the antenna 700 is configured to radiate and receive radio signals in the range of approximately 1.35-1.85 GHz and in the range of approximately 2.2-2.5 GHz, with the objective to operate beyond 5 GHz and up to 6 GHz. Advantageously, the stubs 726 reduce return losses over a wide frequency range. For example, as shown in the plot of FIG. 45, the antenna 700 with stubs 726 has a return loss of less than −12 dB both at mid-band frequencies (e.g., 2.7-3.4 GHz and 3.9-4.4 GHz) and at relatively high frequencies (e.g., from 4.7 GHz to at least 6 GHz). In contrast, the plot of return loss (e.g., S-parameters) vs. frequency for the same antenna configuration but without stubs shows that impedance matching is −11 dB for the above-mentioned mid-band frequencies, and −10 to −8 dB for frequencies of 5 GHz and greater.

Figure 46:
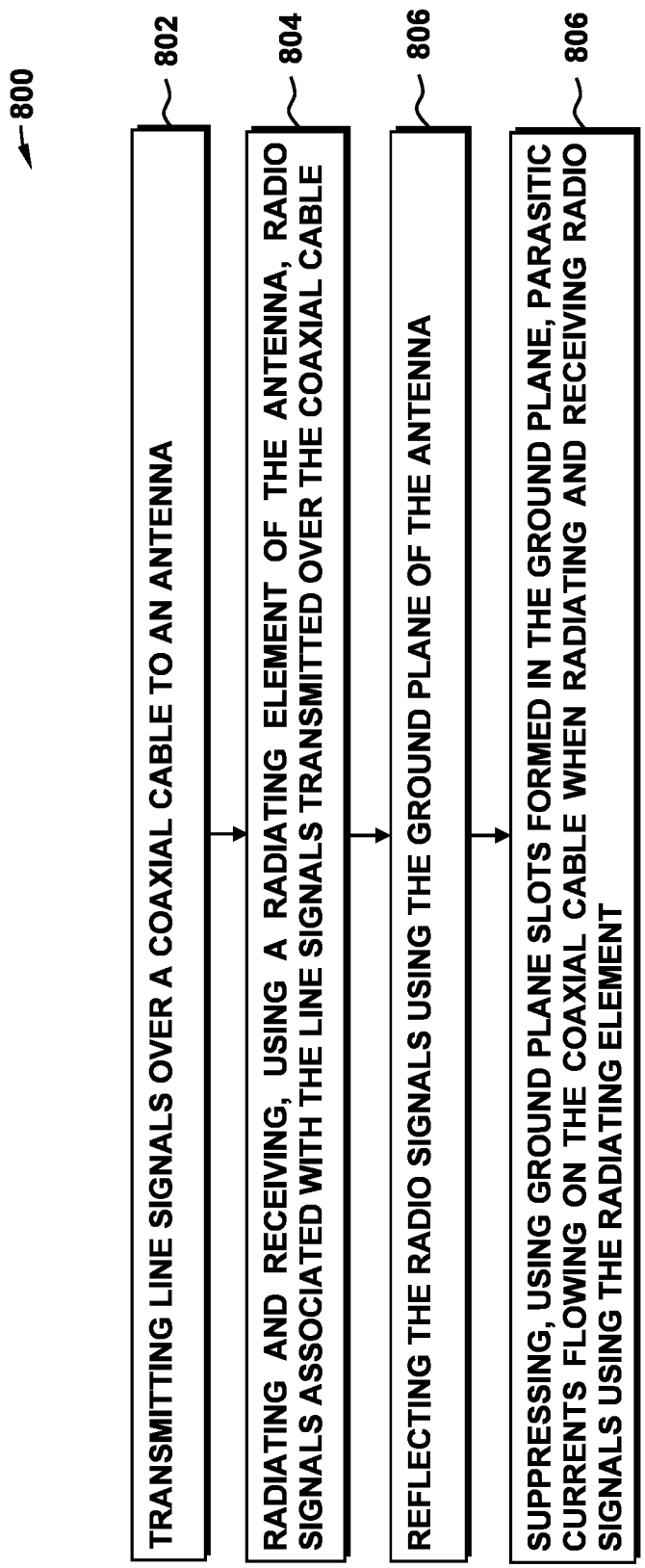
FIG. 46 is a flowchart of operations included in a method of radiating and receiving radio signals using an antenna configured as shown in FIGS. 37-45.

FIG. 46 is a flowchart of operations included in a method 800 of radiating and receiving radio signals using an antenna 700 configured as shown in FIGS. 37-44. Step 802 of the method includes transmitting line signals over a coaxial cable 760 coupled to an antenna 700. As described above, the antenna 700 includes a dielectric substrate 702, a radiating element 712 formed on a first surface 704 of the dielectric substrate 702, and a ground plane 728 formed on the second surface 706 of the dielectric substrate 702. In addition, the antenna 700 includes an edge-mounted connector 740 mounted at the substrate lower edge 708 and electrically connected to the coaxial cable 760. As mentioned above, the edge-mounted connector 740 includes a center pin 748 electrically coupled to a pin pad 722 extending downwardly from the microstrip feed element 720. In addition, the edge-mounted connector 740 includes a plurality of mounting prongs 750 electrically coupled to the ground plane 728 as shown in FIG. 43. The microstrip feed element 720 includes a pair of stubs 726 protruding laterally outwardly respectively from opposite sides of the microstrip feed element 720. As described above, the radiating element 712 includes a pair of one-quarter ellipse portions 716 symmetrically formed on opposite sides of the antenna axis 710 and extending upwardly from and interconnected by a base portion 714. The base portion 714 is defined in part by an elliptically-shaped radiating element lower edge 718. The microstrip feed element 720 extends downwardly from the radiating element lower edge 718 to the substrate lower edge 708. The ground plane 728 has a pair of ground plane slots 736 respectively located on opposite sides of the antenna axis 710. The inner edges of the ground plane slots 736 are separated by a central portion 735 of the ground plane 728.

Step 804 of the method 800 includes radiating and receiving, using the radiating element 712, radio signals associated with the line signals transmitted over the coaxial cable 760. The edge-mounted connector 740 transmits and receives line signals to and from the microstrip feed element 720. Advantageously, the radiating element 712 generates an omnidirectional pattern over a wide range of frequencies. For example, the method includes radiating and receiving radio signals in the range of approximately 1.3-6 GHz and, more preferably, in the range of approximately 1.35-1.85 GHz and approximately 2.2-2.5 GHz, with the capability to operate beyond 5 GHz and up to 6 GHz.

Step 806 of the method 800 includes reflecting the radio signals using the ground plane 728. As described above, the ground plane 728 has a ground plane lower edge 730 that is coincident with the substrate lower edge 708 and has a semicircular ground plane upper edge 732. The ground plane 728 has truncated opposing sides oriented parallel to the antenna axis 710. The radiating element 712 is configured such that when the antenna 700 is viewed along a direction perpendicular to the first surface 704, the ground plane upper edge 732 is located at a feed gap h distance below the radiating element lower edge 718. The ground plane upper edge 732 includes a rectangular notch 734 as described above. The notch 734 is centered on the antenna axis 710. Advantageously, the method includes improving impedance bandwidth of the antenna 700 using the rectangular notch 734 incorporated into the ground plane upper edge 732.

Step 808 of the method 800 includes suppressing, using the ground plane slots 736, parasitic currents (not shown) flowing of the coaxial cable 760 when radiating and receiving radio signals using the radiating element 712. More specifically, the method includes suppressing parasitic currents or attenuating leakage currents flowing over the outer surface of the coaxial cable 760 using the pair of ground plane slots 736 incorporated into the ground plane 728 on opposite sides of the antenna axis 710. As described above, the ground plane slots 736 each extend upwardly from the ground plane lower edge 730 to a location below the ground plane upper edge 732. The inner edge of each one of the ground plane slots 736 is located outside of the outer edge of the microstrip feed element 720. Attenuation of the parasitic currents or leakage currents by the ground plane slots 736 advantageously improves the radiation pattern across a wide range of frequencies.

Although the above-described antenna 700 is sized and configured for radiating and receiving radio signals in the frequency band of approximately 1.3-6 GHz, the above-listed physical dimensions of the antenna 700 components may be scaled down by a given factor as a means to shift the resonant frequency of the antenna 700. For example, by equally scaling down the physical dimensions of the radiating element 712, the microstrip feed element 720, the ground plane 728, and the dielectric substrate 702 (e.g., thickness) by a factor of 2, the resonant frequency of the antenna 700 may be increased by a factor of 2.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. An aircraft, comprising:
  a fuselage;
  a wing assembly coupleable to the fuselage;
  an empennage including a pair of tail booms configured to be removably coupled to the wing assembly;
  the wing assembly including a pair of boom interfaces located on laterally opposite sides of the fuselage, each boom interface protruding above a wing upper surface; and
  each tail boom having a boom forward end configured to be mechanically attached to one of the boom interfaces using an externally-accessible mechanical fastener, at least one of the boom interfaces having a threaded hole in a boom aft attachment fitting on an exterior of the wing assembly, the mechanical fastener being threadably engaged to the threaded hole.

2. The aircraft of claim 1, wherein:
  each boom interface includes a boom forward attachment fitting and the boom aft attachment fitting, protruding from the wing upper surface of the wing assembly, the boom forward attachment fitting having a shear pin bore; and
  each boom forward end includes at least one boom support having a shear pin sized and configured to engage the shear pin bore of the boom forward attachment fitting in a manner preventing movement of the boom forward end along a direction perpendicular to a boom axis.

3. The aircraft of claim 2, wherein:
  the at least one boom support comprises a boom forward support and a boom aft support; and
  the boom aft support including a hole allowing the externally-accessible mechanical fastener to pass through and engage the threaded hole of the boom aft attachment fitting to positively secure the boom aft support to the boom aft attachment fitting.

4. The aircraft of claim 3, wherein:
  the boom aft attachment fitting has a wedge-shaped cross-section when viewed from a top-down direction; and
  the boom aft support having a pair of flanges defining a wedge-shaped cavity configured be in direct physical contact with interior surfaces of the flanges when the externally-accessible mechanical fastener is engaged to the threaded hole.

5. The aircraft of claim 2, wherein:
  the wing assembly includes a pair of wing ribs; and
  the boom attachment fitting of each one of the tail booms is mechanically fastened to one of the wing ribs.

6. The aircraft of claim 2, wherein:
the shear pin has a tapered end, to facilitate insertion into the shear pin bore.

7. The aircraft of claim 1, wherein:
each tail boom has a boom aft end having a vertical tail extending upwardly from the tail boom; and
the empennage includes a horizontal tail extending between and removably coupled to the vertical tail of the pair of tail booms.

8. The aircraft of claim 1, wherein
the wing assembly includes a wing center module, and a pair of wings;
the wing center module is configured to be removably coupled to the fuselage; and
each wing is configured to be removably coupled to the wing center module by inserting a joiner spar protruding from the wing into a joiner spar pocket incorporated into a wing rib on a laterally outboard side of the wing center module.

9. The aircraft of claim 1, further including:
a flap operably coupled to each wing of the wing assembly in a manner such that when the flap is in a neutral position, air is prevented from flowing between the wing and a flap leading edge, and when the flap is in a downwardly deflected position, a slot opens up between the flap leading edge and the wing, the slot configured to allow air from a wing lower surface to flow upwardly through the slot and aftwardly along a flap upper surface.

10. The aircraft of claim 1, further including:
a propulsion unit mounted on an aft end of the fuselage.

11. An unmanned aerial vehicle, comprising:
a fuselage;
a wing assembly coupleable to the fuselage;
an empennage including a pair of tail booms configured to be removably coupled to the wing assembly;
the wing assembly including a pair of boom interfaces located on laterally opposite sides of the fuselage, each boom interface protruding above a wing upper surface; and
each tail boom having a boom forward end configured to be mechanically attached to one of the boom interfaces using an externally-accessible mechanical fastener, at least one of the boom interfaces having a threaded hole in a boom aft attachment fitting on an exterior of the wing assembly, the mechanical fastener being threadably engaged to the threaded hole.

12. A method of enhancing vehicle efficiency, comprising:
attaching a pair of tail booms of an empennage to a wing assembly mounted to a fuselage, by performing the following for each one of the tail booms:
positioning a boom forward end of a tail boom against a boom interface of the wing assembly, the boom interface protruding above a wing upper surface; and
installing at least one externally-accessible mechanical fastener through the boom forward end and threadably engaging the mechanical fastener into a threaded hole formed in a boom aft attachment fitting of the boom interface on an exterior of the wing assembly.

13. The method of claim 12, wherein the step of positioning the boom forward end against the boom interface comprises:
inserting a shear pin protruding from a boom support of the boom forward end, into a shear pin bore formed in a boom forward attachment fitting of the boom interface.

14. The method of claim 13, wherein the step of inserting the shear pin of the boom support into the shear pin bore of the boom forward attachment fitting comprises:
inserting the shear pin protruding forwardly from a boom forward support of the boom forward end into the shear pin bore formed in the boom forward attachment fitting of the boom interface, while simultaneously inserting a shear pin protruding from the boom aft attachment fitting of the boom interface into a shear pin bore formed in a boom aft support of the boom forward end.

15. The method of claim 14, further comprising:
engaging a wedge-shaped cross-section of the boom aft attachment fitting into direct physical contact with interior surfaces of a pair of flanges arranged in a V shape on the boom aft support.

16. The method of claim 12, wherein:
the wing assembly includes a pair of wing ribs; and
each one of the tail booms having a boom attachment mechanically fastened to one of the wing ribs.

17. The method of claim 12, wherein the pair of tail booms include a left boom and a right boom, the method further including:
coupling, using one or more mechanical fasteners, laterally opposite sides of a horizontal tail to a pair of vertical tails respectively of the left boom and the right boom.

18. The method of claim 12, further including:
coupling a wing to each of a left side and a right side of a wing center module of the wing assembly.

19. The method of claim 12, wherein:
the aircraft is an unmanned aerial vehicle.

20. The method of claim 12, wherein:
the aircraft includes a propulsion unit mounted on an aft end of the fuselage.

* * * * *